United States Patent
Rowe et al.

(10) Patent No.: US 12,288,185 B2
(45) Date of Patent: Apr. 29, 2025

(54) SYSTEM AND METHODS FOR MANAGING OIL AND GAS PRODUCTION EQUIPMENT

(71) Applicant: Oxy USA Inc., Houston, TX (US)

(72) Inventors: Terrell L. Rowe, Houston, TX (US); John E. Stachowiak, Jr., Houston, TX (US); Oscar Martinez, Houston, TX (US); Jason W. Bailey, Houston, TX (US)

(73) Assignee: Oxy USA Inc., Houston, TX (US)

( * ) Notice: Subject to any disclaimer, the term of this patent is extended or adjusted under 35 U.S.C. 154(b) by 565 days.

(21) Appl. No.: 17/420,214

(22) PCT Filed: Jan. 3, 2020

(86) PCT No.: PCT/US2020/012163
§ 371 (c)(1),
(2) Date: Jul. 1, 2021

(87) PCT Pub. No.: WO2020/142673
PCT Pub. Date: Jul. 9, 2020

(65) Prior Publication Data
US 2022/0067641 A1    Mar. 3, 2022

Related U.S. Application Data

(60) Provisional application No. 62/787,875, filed on Jan. 3, 2019.

(51) Int. Cl.
*E21B 17/00*     (2006.01)
*E21B 33/03*     (2006.01)
(Continued)

(52) U.S. Cl.
CPC ........... *G06Q 10/087* (2013.01); *E21B 17/00* (2013.01); *E21B 33/03* (2013.01); *E21B 47/01* (2013.01);
(Continued)

(58) Field of Classification Search
None
See application file for complete search history.

(56) References Cited

U.S. PATENT DOCUMENTS 7,159,654 B2 *   1/2007  Ellison .................... E21B 44/00
                                                   166/250.01
7,412,761 B2     8/2008  Male et al.
(Continued)

FOREIGN PATENT DOCUMENTS

CA          2964243 A1 * 10/2017
CN       201339446 Y     11/2009
(Continued)

OTHER PUBLICATIONS

RU-2557464 English Language Translation (Year: 2015).*
(Continued)

*Primary Examiner* — Curtis A Kuntz
*Assistant Examiner* — Jerold B Murphy
(74) *Attorney, Agent, or Firm* — Renner, Kenner; Arthur M. Reginelli

(57) ABSTRACT

A system for managing well production equipment, the system comprising a) an RFID tag reader associated with a production well within a production well field, said RFID tag reader being positioned to read RFID tags associated with well production equipment as the well production equipment is run into said production well; and b) a data processing unit in communication with said RFID tag reader associated with a production well.

11 Claims, 21 Drawing Sheets

(51) Int. Cl.
*E21B 47/01* (2012.01)
*G01V 15/00* (2006.01)
*G06K 7/10* (2006.01)
*G06Q 10/087* (2023.01)
*G06Q 10/0875* (2023.01)
*G06Q 50/02* (2012.01)

(52) U.S. Cl.
CPC ......... *G06K 7/10366* (2013.01); *G06Q 50/02* (2013.01)

(56) References Cited

U.S. PATENT DOCUMENTS

| | | |
|---|---|---|
| 7,707,076 B1 | 4/2010 | Whiteley et al. |
| 8,463,664 B2 | 6/2013 | Griggs et al. |
| 8,947,256 B2 | 2/2015 | Xin et al. |
| 9,140,113 B2 | 9/2015 | Hurst et al. |
| 9,963,955 B2 | 5/2018 | Tolman et al. |
| 2004/0078306 A1 | 4/2004 | Whiteley et al. |
| 2006/0027129 A1 | 11/2006 | Ward et al. |
| 2006/0271299 A1* | 11/2006 | Ward ............ E21B 47/022 702/6 |
| 2012/0126008 A1 | 5/2012 | Binmore |
| 2016/0290127 A1* | 10/2016 | Stephenson ........... G06Q 10/20 |
| 2016/0312603 A1* | 10/2016 | Gottlieb ............... E21B 47/095 |
| 2016/0342916 A1* | 11/2016 | Arceneaux ....... G06Q 10/06313 |
| 2017/0032149 A1 | 2/2017 | Sengupta et al. |
| 2017/0246778 A1* | 8/2017 | Trowbridge ............ E21B 47/01 |
| 2019/0063175 A1* | 2/2019 | Papadimitriou ........ E21B 44/00 |

FOREIGN PATENT DOCUMENTS

| | | |
|---|---|---|
| CN | 203179043 U | 9/2013 |
| IN | 205422565 U | 8/2016 |
| RU | 2514870 C1 | 5/2014 |
| RU | 2557464 C1 | 7/2015 |
| RU | 2557464 C2 * | 7/2015 |

OTHER PUBLICATIONS

International Search Report and Written Opinion for corresponding PCT/US2020/012163 dated Mar. 21, 2020 (14 pp).
Presentation—7th Annual Sucker Rod Pumping Workshop, Oklahoma City, OK Sep. 27-30, 2011; "The Benefit of Sucker Rod Shot Peening" Norman W. Hein, Jr., P.E. (28 pps).
Presentation—SEDGC 2015, CP International, Inc. "RFID Band it asset integrity products, Innovative Asset tracking solutions for oil and gas" (19 pps).
Web page: http:/exceed.ggsitebuilder.com/smart-rod-rfid/ ; "Smart Rod RFID," Dec. 19, 2018.
Web page: http://petrosyncofs.com/products/sucker-rod-guides/ ; Petrosync Oilfield Services Pvt. Ltd. Dec. 19, 2019.
Pamphlet: Weir Oil & Gas; Spm Rfid Technology (2017) (1 pp).
Brochure: Exceed Oilfield Equipment Canada; "Sucker Rods" (4 pps).

* cited by examiner

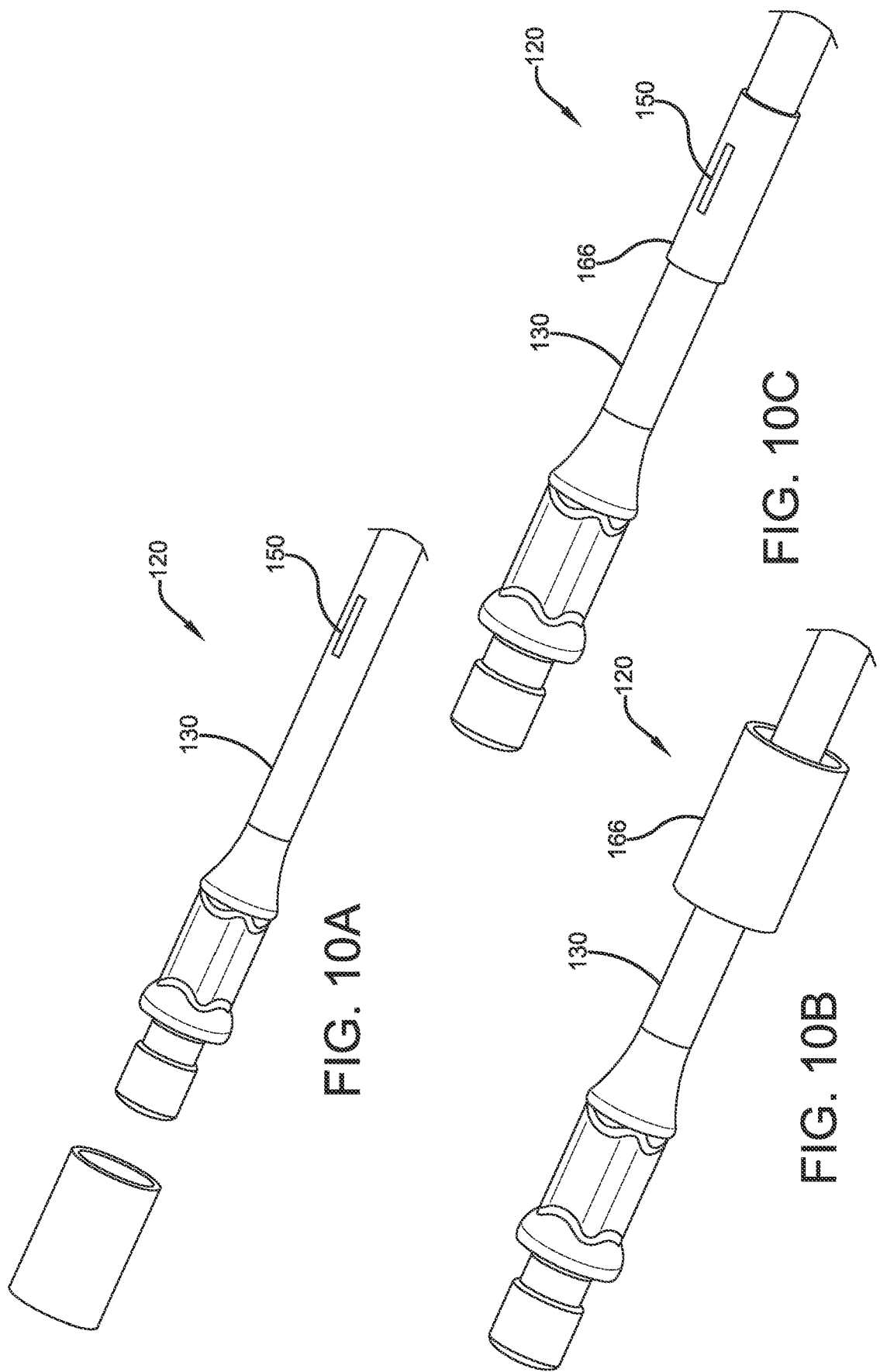

SYSTEM AND METHODS FOR MANAGING OIL AND GAS PRODUCTION EQUIPMENT

PRIORITY

This application is a National-Stage Application of PCT/US2020/012163 filed on Jan. 3, 2020, which claims the benefit of U.S. Provisional Application Ser. No. 62/787,875 filed on Jan. 3, 2019, which are incorporated herein by reference.

FIELD OF THE INVENTION

Embodiments of the present invention provide systems and methods for managing gas and oil production equipment, particularly downhole equipment such as sucker rods.

BACKGROUND OF THE INVENTION

Radio Frequency Identification (RFID) tags are used for various purposes. RFID tags come in two broad categories. Active RFID tags have their own power source, typically a battery, and are typically configured to continuously transmit their data payload. When they come within range of an Active RFID detector, which can be configured as a "listen only" device, the Active RFID detector will detect the transmitted signal and respond according to its program.

By contrast, passive RFID tags do not have their own power source, and are instead powered by a passive RFID tag reader. Generally, a passive RFID tag reader emits a relatively high frequency electromagnetic field (VHF band). This field stimulates a coil in the passive RFID tag that then charges a capacitor within the passive tag that serves as the passive tag's power source. Once the capacitor is charged, the passive tag begins transmitting its payload (typically in the LF band) until the charge in the capacitor is depleted. This transmitted signal can then be detected by the passive RFID tag reader.

Sucker rods are an example oil field equipment. Sucker rods can be used in reciprocating pump systems in which the rod is reciprocated in a well, or they can be used in progressive cavity pump system in which the rod is rotated in the well. Either way, hundreds of rods can be used in the well and are subject to fatigue. Various rods in the well may have been manufactured at different times, may have been reused in other wells, may have been subject to different fatigue conditions, and may have been inspected at different intervals. It is therefore very helpful to he able to identify and track sucker rods to monitor these and other aspects of the rods.

The subject matter of the present disclosure is directed to overcoming, or at least reducing the effects of, one or more of the problems set forth above.

SUMMARY OF THE INVENTION

One or more embodiments of the present invention provide a system for managing well production equipment, the system comprising an RFID tag reader associated with a production well within a production well field, said RFID tag reader being positioned to read RFID tags associated with well production equipment as the well production equipment is run into said production well; and a data processing unit in communication with said RFID tag reader associated with a production well.

Other embodiments of the present invention provide a process for managing well production equipment, the process comprising a) providing a plurality of well production devices having an RFID tag associated therewith; b) providing a production well located within a production well field, said production well including a wellhead; and c) tracking the plurality of well production devices as the well production devices are run into the production well by receiving identity information from an RFID tag reader positioned at the wellhead as the well production devices are run into the well, where said identity information includes information relative to the identity of the RFID tag that is read by the RFID tag reader.

Yet other embodiments of the present invention provide a production assembly for producing gas and oil, the device comprising a production device; and an RFID tag secured to the production device.

Still other embodiments of the present invention provide a wellhead assembly adapted to position an RFID reader proximate to the wellhead of the assembly and provide for reading of RFID tags secured to production equipment while the production equipment is run into or pulled from the wellhead, the wellhead assembly comprising a) a wellhead position near the top of a production well; b) a housing secured above the well head, said housing including an opening generally aligned with the longitudinal direction of the production well to thereby allow production equipment to pass through said opening while the production equipment is run into or pulled from said production well; and c) an reader positioned within said housing and oriented. to communicate with RFID tags secured to production equipment while the production equipment is run into or pulled from the wellhead.

BRIEF DESCRIPTION OF THE DRAWINGS

FIGS. 10A-10C is a side perspective view of an end of a sucker rod having an RFID tag supported on the rod by a heat shrink sleeve.

DETAILED DESCRIPTION OF ILLUSTRATIVE EMBODIMENTS

Figure 1:
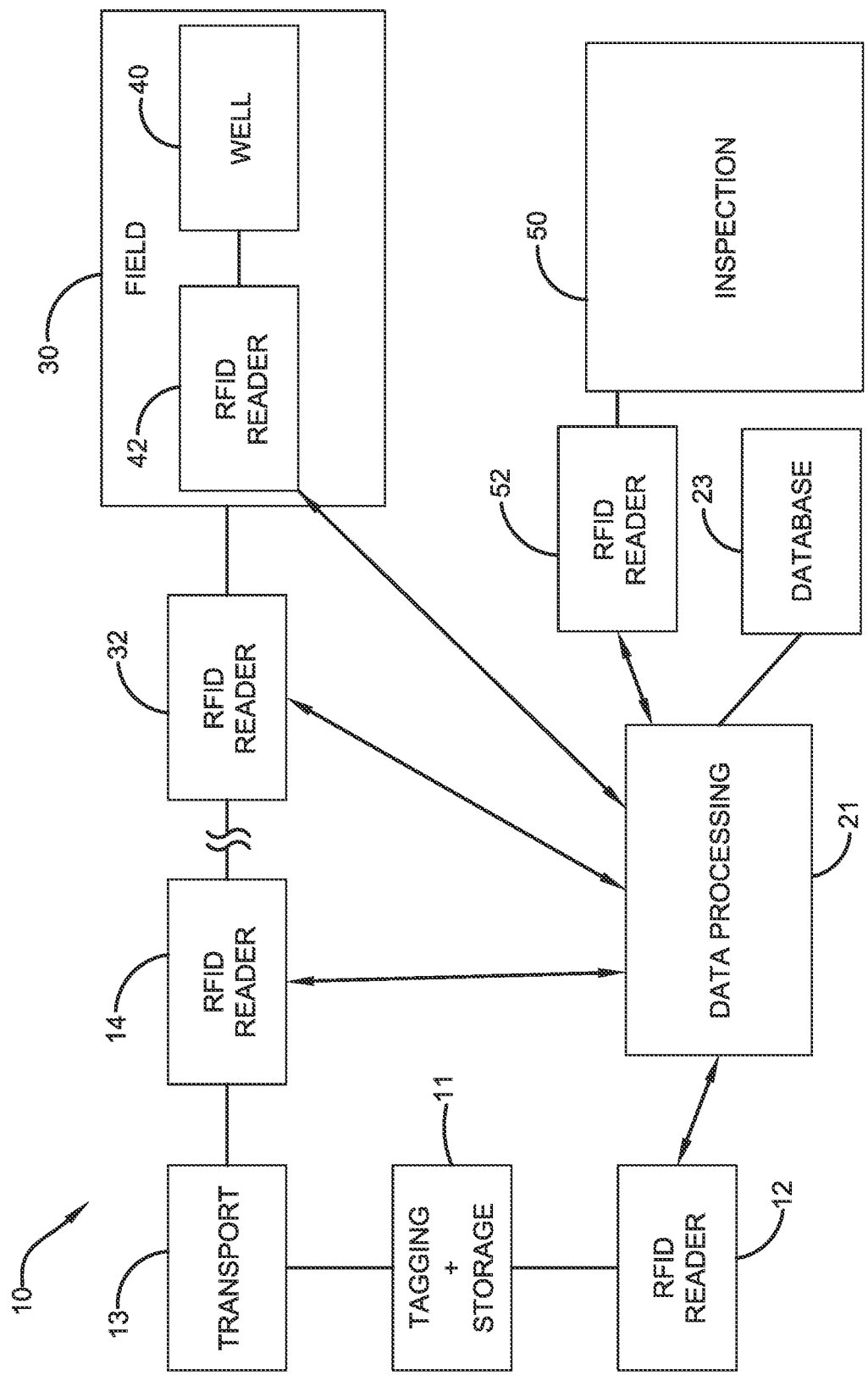
FIG. 1 is a schematic diagram of a system for managing well production equipment according to embodiments of the present invention.

Embodiments of the invention are based, at least in part, on the discovery of a system and related methods for managing oil field production equipment. In one or more embodiments, radio frequency identification (RFID) tags, which may also be referred to as an RFID chips, are secured to well production equipment and the equipment is tracked by using the RFID tags. For example, the equipment is tracked during the life of the equipment including initial construction or assembly, storage, shipping and use within a well. According to certain embodiments, the RFID tags are secured to the production equipment (e.g. rods, tubing and casing) in a manner that allows for relatively easy reading of the RFID tags, especially at the time the equipment is run into the well and the time it is pulled from the well.

Tracking System Overview

Aspects of the system can be described with reference to FIG. 1, which shows tracking system 10 including equipment tagging and storage station 11. For example, where the equipment includes sucker rods, the rods can be provided with or otherwise associated with RFID tags (i.e. tagged) and read using reader 12, which reader may be associated with station 11. The tagged rods can then be placed into storage. The information obtained from the tags, such as the identity of the RFID tag, can be communicated to a central processing station 21, which may be referred to as central data processing 21 or central operation system 21, where the information relating to the identity of the tag can be combined with other information such as, but not limited to, the date and location of the reading. In one or more embodiments, central data processing 21 may be in communication with or otherwise associated with a central database 23. Those skilled in the art will appreciated that conventional forms of communication can be used between the various devices (e.g. tag reader 12, processing unit 21, and database 23) including, but not limited to, cables, wireless, cellular, satellite, and the like.

In particular embodiments, the RFID tags are passive tags and therefore power is supplied to the RFID tags as part of the step of reading the tag. In other embodiments, the RFID tags are active tags and therefore the tags include their own source of power for transmitting information to a reader. In yet other embodiments, the tags are of the type that can store information including information that can be updated (i.e. written to) the tag during when in communication with RFID readers adapted to write to the tag.

During operation of system 10, when there is a need for production equipment in a production field 30, which may also be referred to as a well field 30 or a hydrocarbon field 30 (e.g. sucker rods are needed at one or more wells within the field), the rods within storage station 11 are loaded for transport 13 to field 30. For purposes of this specification, field 30 is of the type known in the art for producing gas and/or oil, which fields typically include a plurality of production wells, which are wells adapted to extract oil and/or gas from a subsurface reservoir and bring the gas and/or oil to the surface. Information relative to the particular demand for equipment at one or more production wells within the field can be communicated through operating system 21 or another operating system that may be in communication with operating system 21 and/or database 23. Upon exiting station 11 via transport 13, the RFID tags are read by an exit reader 14 positioned or otherwise adapted to read equipment leaving station 11 via transport 13. Reader 14 reads the RFID tags associated with equipment loaded for transport, and information obtained from the tags can be communicated to data processing 21 where the information, such as the identity of the tag, can be stored at database 23 and combined with other information such as, but not limited to, the date and destination of the equipment. For example, sucker rods can be loaded onto a transportation vehicle, and as the vehicle leaves the location associated with station 11, RFID readers can be located at or near the exit to read the RFID tags loaded on the vehicle and leaving the station.

Upon arrival at a field 30, which is the location where the sucker rods are desired, arrival RFID readers 32 read the RFID tags associated with the production equipment arriving at the location. Information obtained from the tags can be communicated to central data processing 21 where the information, such as the identity of the tag, can be stored at database 23 and combined with other information such as, but not limited to, the date of arrival and the location of field 30. After reading the RFID tags upon arrival, the production equipment can optionally be placed into field storage as it awaits use at the field (i.e. use within a well).

The production equipment (e.g. sucker rods) is used at production well 40. As is known in the art, production well 40 includes a wellbore, which is also known as a bore hole, and a production system, which are described in greater detail below. The tagged production equipment may be a component of the production system. According to aspects of this invention, the tagged production equipment can be run into the wellbore by using conventional techniques. An RFID wellhead reader 42 is associated with the wellbore and is adapted to read the RFID tags associated with the production equipment as the equipment is run into the well. Aspects of the invention are directed toward wellhead readers, which are described in greater detail below. Information obtained from the tags read at the time the equipment is run into the wellbore can be communicated to central data processing 21 where the information, such as the identity of the tag, can be stored at database 23 and combined with other information such as, but not limited to, the date of installation into the well and the location of the tag (and associated equipment) within the wellbore (e.g. the depth of a given piece of equipment can be determined with knowledge of the order or sequence that the rod was run into the wellbore).

Aspects of the invention include the analysis and gathering of information related to the production operation. This may include both information related to the production system and information related to the well environment. For example, the production system may be analyzed and information gathered relative to, for example and without limitation, the number of pump cycles, the loads or stresses on the rod string, and any buckling of the rods on a given stroke. Exemplary environmental information may include, without limitation, downhole temperatures, pressures, the presence of hydrogen sulfide, the presence of carbon dioxide, and sand content. Using known techniques, this information can be communicated to data processing 21, stored at database 23, and ultimately combined and correlated with information relative to the identity of the various pieces of equipment.

The production equipment (e.g. sucker rods) is then pulled from wellbore 40 using conventional techniques. Associated therewith, RFID wellhead reader 42 is adapted to read the RFID tags as the equipment is being pulled from the well. Information obtained from the tags can communicated to central database 21 where the information, such as the identity of the tag, can be combined with other information such as, but not limited to, the date that the equipment is pulled, well production information (e.g. the number of cycles experienced by the equipment within the wellbore) and environmental information (e.g. downhole temperatures experienced during use in production. This information can be communicated to data processing 21 by using a variety of techniques including, but not limited to, data processing instrumentation at wellhead reader 42 that is in communication with data processing 21.

Aspects of the invention also include inspecting the production equipment while the equipment is at a surface location. This may include storage at a storage facility or at a field location. With reference to FIG. 1, inspection 50 includes a RFID reader 52. Information obtained from the tags read at the time the equipment is inspected can be communicated to central data processing 21 where the information, such as the identity of the tag, can be stored at database 23 and combined with other information such as, but not limited to, the date of installation into the well and the location of the tag (and associated equipment) with in the wellbore. According to these embodiments, information derived from the inspection is likewise communicated to data processing 21 and stored at database 23. This information may include, by way of example and without limitation, wear details, corrosion observations, and pass/fail for threads and straightness. This information can be communicated by using a variety of techniques including, but not limited to, data processing instrumentation at inspection station 50 that is in communication with data processing 21.

Thus, it should be appreciated that central data processing 21 and database 23 therefore have information relative to the various pieces of production equipment, and this information can be used to decide whether to reuse any particular piece of equipment within the same or a different production well. This information can also be used to determine a location within a given well where the use of the equipment might be desired. Depending on the information, and any associated analysis, the equipment can be earmarked for repair or retirement. Where the particular piece of equipment is deemed to have existing life, the equipment can be used within the same field location, or in other embodiments, it can be transported to another field or to a storage station for use at a later date. In either event, strategically placed RFID readers can be used to track and monitor the location and other relevant data associated with the equipment. Additionally, data processing 21 and database 23 can receive, process, and store information for multiple systems across several well sites.

It should also be appreciated that the systems of this invention, and the associated processes, can be used for inventory control, shipping tracking, inspection history, life cycle monitoring, etc. For inventory control, the RFID tags on the sucker rods can be used to track manufacturing plant inventory along with various off-site location inventories. The RFID tags can be used to trace the transport of each rod to and from locations, and the RFID tags can further track the installation/removal of the rods in a given well. For example, the RFID tags on the sucker rods can be scanned at the wellhead during installation and removal (i.e. while being run or pulled from the well). This can allow operators to know the number of removals and re-installations of a given rod along its run-life, thereby enabling operators to assess the life for each sucker rod. This information can also be used for failure analysis, inspection history, warranty information, and a number of other purposes.

Production Well System and Associated Equipment

Figure 2:
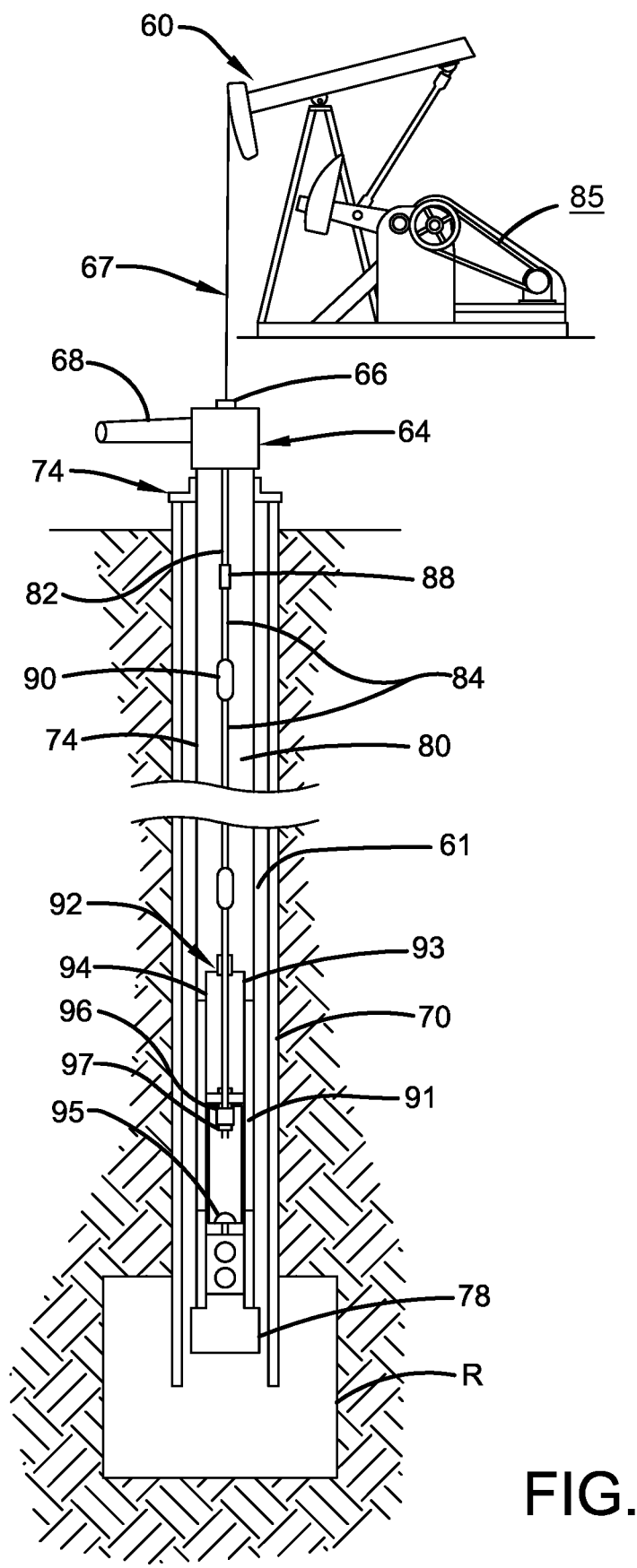
FIG. 2 is a schematic diagram of a production well associated with one or more embodiments of the present invention.

The production well and production equipment that embody aspects of the present invention can be understood with reference with FIG. 2, which shows production well system 60 including wellbore 61 cut into strata S. Wellbore 61 creates fluid communication between reservoir R and wellhead 64. Welllhead 64 includes stuffing box 66, which seals wellhead 64 to a polished rod 67 and thereby prevents leakage of liquids or gases from the interface between wellhead 64 and rod 67. During production, fluids and gases transferred from reservoir R to wellhead 64 are removed from wellhead 64 via flowline 68.

As those skilled in the art appreciate, wellbore 61 is cased with a casing string 70, which is typically cemented in place with a cement (not shown). Casing string 70 typically includes a plurality of individual casing elements (i.e. pipes) connected to each other through couplings to form the casing string. The individual casing elements are typically about 40 feet in length and vary in diameter based upon their location within the well. While not shown in FIG. 2, a typical well will include a casing system that includes several concentric casing strings of varying lengths with the innermost casing string typically extending from the bottom of the casing system to the surface. The outermost casing, which can be referred to as the conductor casing is typically the shortest of various casing strings. According to aspects of this invention, each casing element of string 70 can carry an RFID tag disposed thereon within a securement.

A tubing string 74, which may also be referred to as production tubing string 74, is disposed within casing string 70. In a similar fashion to casing string 70, tubing string 74 typically includes a plurality of individual tubing elements connected to each other to form the tubing sting. The tubing elements are generally pipes of about 30-32 feet in length with nominal diameters that are generally from about 2⅜" to about 4½". These tubes are often constructed of stainless steel or other steel alloys such as carbon steel. According to aspects of this invention, each tubing element of string 74 can carry an RFID tag disposed thereon within a securement, which securements will be described in greater detail below. As generally shown in FIG. 2, the lowermost portion of tubing string 74 may be modified to include a bottom hole assembly (BHA) 78, which may include additional equipment, such as screens, adapted to separate gases and sand, as well as anchors such as mud and tubing anchors.

Sucker rod string 80 is disposed within production tubing string 74. In a similar fashion to casing string 70 and tubing string 74, sucker rod string 80 typically includes a plurality of individual rod elements (e.g. 82 and 84) connected to each other to form the string. Typically, sucker rod strings are constructed in the field. According to aspects of this invention, each rod element of string 80 can carry an RFID tag assembly 90 disposed thereon, which as described in greater detail below, may include an RFID tag and a securement. As specifically shown in FIG. 2, rod string 80 includes sucker rods 82, 84 connected end-to-end by coupling 88. As those skilled in the art appreciate, the sucker rods and couplings have standards for design, manufacture, and assembly from the American Petroleum Institute (API). For example, the rods are generally solid in construction and are fabricated from steel or steel alloys (e.g. carbon steel), but may also be constructed from fiberglass or composites such as carbon fiber rods. Generally, the rods are about 20 to about 40 feet in length and are connected or otherwise spliced using knows technologies. In certain embodiments, the sucker rod string is constructed from a continuous coil, and according to aspects of this invention, an RFID tag and optionally an accompanying securement, is attached intermittently along the length of the coil.

As shown in FIG. 2, sucker rod string 80 is connected to a reciprocating pump system 92, which is typically located proximate to reservoir R within borehole 61. As shown, pump system 92 includes a downhole pump 93, which includes a barrel 94 with a standing valve 95 located at the bottom of pump 93. Standing valve 95 allows fluid to enter from the wellbore while preventing fluid from leaving. Inside pump barrel 94, a plunger 96 has a traveling valve 97, which allows fluid to move from below plunger 96 to production tubing string 74 above, but does not allow fluid to return from tubing 74 to the pump barrel 94 below plunger 96. As also shown, downhole pump 93 can be secured within tube string 74 with seating nipple 91.

A driving source 85, which may include, without limitation, a pump jack or pumping unit, at the surface is in mechanical communication with plunger 96 via rod string 80 and thereby moves plunger 96 up and down cyclically in upstrokes and down strokes to lift fluid to the surface. That is, when operated, driving source 85 cyclically raises and lowers a downhole plunger via rod string 80, and with each stroke, the downhole pump lifts well fluids toward the surface through tubing string 74.

In general terms, driving source 85, rod string 80, and pump 92 are referred to collectively as a lift system. Those skilled in the art appreciated that a variety of lift systems are commonly used in oil and gas production. For example, in lieu of a plunger pump, as shown in FIG. 1, which pump is also referred to as a sucker rod pump, a progressive cavity pump (PCP) can be employed where the rod string delivers energy to the pump via rotational motion. Other common lift systems include, without limitation, electrical submersible pumps (ESPs), jet-pump lift systems, and gas-lift, as well as multi-stage pumps systems such as centrifugal pumps staged throughout the depth of the well. As those skilled in the art will appreciate in view of this specification, the various components of these lifts systems can be modified or associated with one or more RFID tags to provide monitoring of the various pieces of equipment or components of these lift systems. For example, power cables can be tagged with RFID tags. Or, gas-lift valves or other components associated with various lift systems can be tagged with RFID tags, and in other embodiments, components of a bottom hole assembly can be tagged.

Rods, Tubing, and Casings With Securements

As indicated above, aspects of the invention include production equipment assemblies that include the a production equipment device, an RFID tag, and an optional securement that mounts or otherwise associates, holds, mates or affixes (depending on the type of securement as described below) the RFID tag to the production equipment. As also described above, in certain embodiments, the production equipment can include casings, tubing, and sucker rods. In these or other embodiments, the RFID tags can passive tags or active tags.

Generally, the securements, which may also be referred to as securing devices, are devices adapted to secure, hold, enclose, and/or retain the RFID tags on the rod so that RFID tags will remain on the rod when run into a well, when installed in the well, and when removed from the well. Moreover, the securements may optionally remain on the rod during inspection, which may include shot peening processes used to clean/increase fatigue properties of the sucker rod. In typical inspection procedures, any centralizers or conventional guides over-molded on the rod are removed by operators so the full extent of underlying surface of the rod can be inspected. In one or more embodiments, however, the securing devices and the RFID tags may not be removed from the rod even when inspecting. Accordingly, in one or more embodiments, the securing devices can be configured to withstand the entire process used to inspect the rod.

Figure 3:
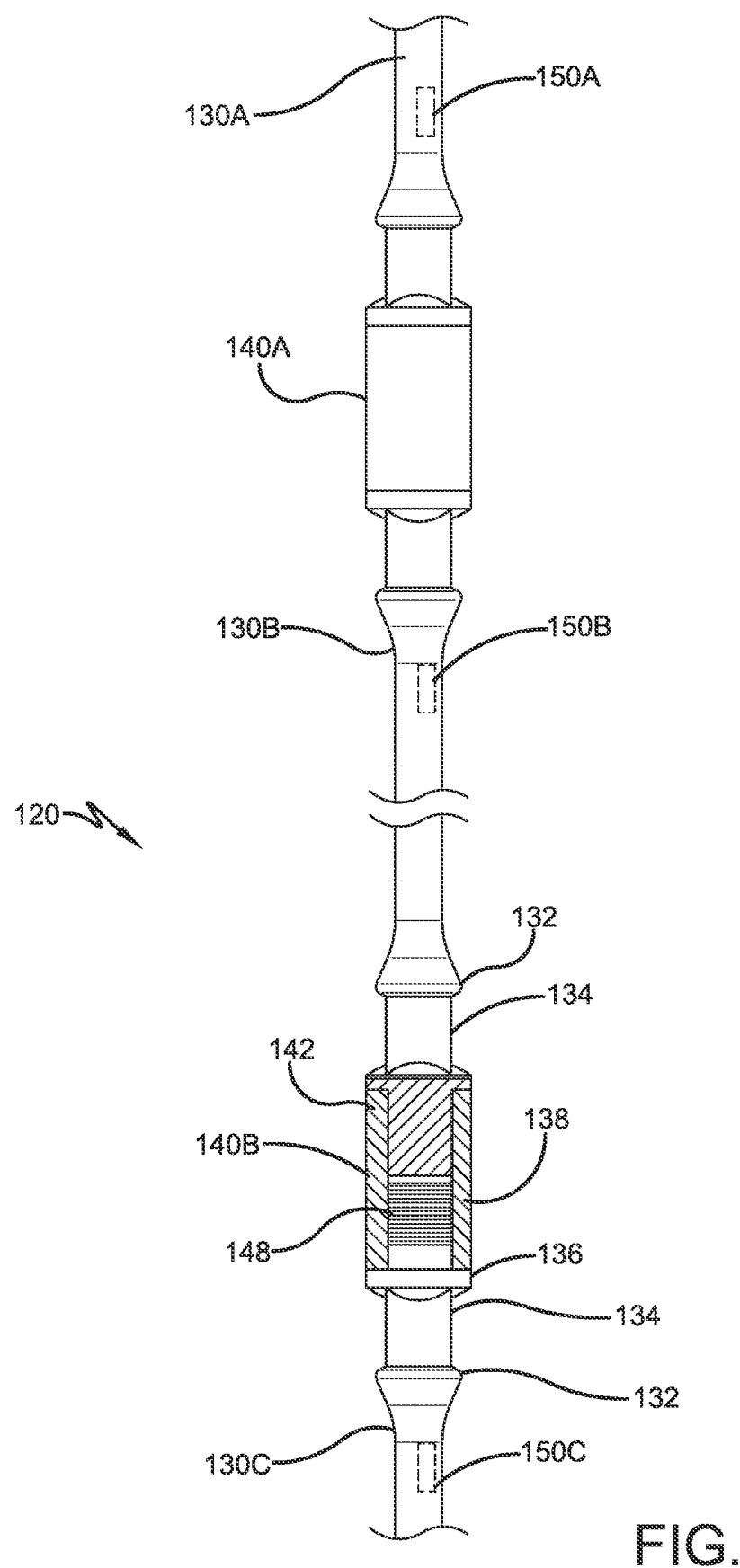
FIG. 3 is a side perspective view of a sucker rod assembly according to one or more embodiments of the present invention.

An exemplary assembly can be understood with reference to FIG. 3, which shows sucker rod assembly 120, which can be used with a lift system as described with reference to FIG. 2 above, or with other artificial lift systems that employ rods such as a progressive cavity pump system or the like. Assembly 120 includes a plurality of sucker rods 130a-130c made-up end-to-end with a plurality of couplings 140a, 140b. For each sucker rod connection, ends of the sucker rods 130a-130c are screwed into opposite ends of the threaded rod couplings 140a, 140b respectively. As indicted above, each sucker rod 130a, 130b, 130c can be about 20 to about 40 feet in length (e.g. 25 to 30-ft. (7.6 and 9.1-m)). Pony rods are similar, but considerably shorter for use near the surface. The sucker rods 130a, 130b, 130c can have any suitable diameter for the application at hand and typically has diameters of ⅝, ¾, ⅞, 1 and 1-⅛-in. Sucker rod 130a, 130b, 130c can he formed from a number of materials including, but not limited to, carbon-manganese alloy steel, chromium-molybdenum alloy steel, nickel-molybdenum alloy steel, nickel-chrome steel, nickel-chromium molybdenum alloy steel, fiberglass, and carbon fiber composites. Couplings 140a, 140b may be composed of a high strength alloy steel. Couplings 140a, 140b also may have any suitable diameter for the application at hand and may typically have a length of about 4 to 4.5-in.

The ends of adjoining sucker rods 130a, 130b, 130c each include a pin connection 138 that screws into the bore 142 of the couplings 140a, 140b. Typically, the rod end transitions to a Upset bead 132a, 132b followed by a wrench square 134 having flats for tongs and other tools. The rod end then terminates in a pin shoulder 136 of a pin connection 138. Couplings 140a, 140b for making up the ends of adjoining sucker rods 130a, 130b, 130c defines an internal bore 142 with box connections 148 configured to tightly abut pin shoulders 136 of the adjoining rods. As shown in FIG. 3, assembly 120 includes RFID tags 150a, 15b, 150c.

While the RFID tags can be associated with the production equipment by employing a number of techniques and associated securements, the RFID tags and the associated securements can be adapted or configured to withstand the downhole environment including well fluids, high temperatures (e.g. temperatures as high as 350° F.), fluctuations in temperatures, hydrogen sulfide ($H_2S$), carbon dioxide ($CO_2$), high pressures (e.g., pressures as high as 5000 psi), and the like.

Additionally, because the rods are dynamic within the pumping operations (e.g. reciprocate in a reciprocating pump system or rotate in a progressive cavity pump system), the tags and their associated securements are configured to withstand the loads during operation. For example, the tags and their associated securements may be adapted or configured to withstand shock loading. While not necessarily common, the tags and their associated securements may be adapted to withstand impact.

According to one or more embodiments of the invention, the RFID tags are generally mounted to the production equipment in a manner that allows for the tag to be read during various stages of the equipment's useful life including, but not limited to, manufacture, assembly, storage, and during installation and removal from the well. Therefore, according to aspects of this invention, the tags are placed on (or at least near) the exterior of the equipment (e.g. the exterior of a sucker rod), which permits, among other advantages, transmission of the RFID signal even when the equipment is connected together in a string (e.g. a sucker rod string). For example, when operators remove sucker rods 130a, 130b, 130c from the well, they may pull the rods in connected sections of three rods from the well without uncoupling the connectors 140a, 140b. Aspects of the invention are therefore advantageous since the RFID tags associated with the coupled rods 130a, 130b, 130c can be directly read at the wellhead during running (i.e. insertion) or removal (i.e. pulling) without uncoupling the rods.

Aspects of the invention also provide for placement of the RFID tags so that they do not complicate the manufacturing process of the rods or inhibit the inspection of the rods. For example, manufacture of a sucker rod may involve forming the rod with the ends forged with desired features (e.g. head 132, wrench square 134, shoulder 136, pin 138). Accordingly, the rods may be heat treated and shot peened. For example, pin threads may be formed on the forged pins, and the rods may be dipped in a corrosion inhibitor. In the course of these procedures, it may be advantageous to place or secure the tags to rods without requiring other involved processes such as over-molding processes.

Figure 4A:
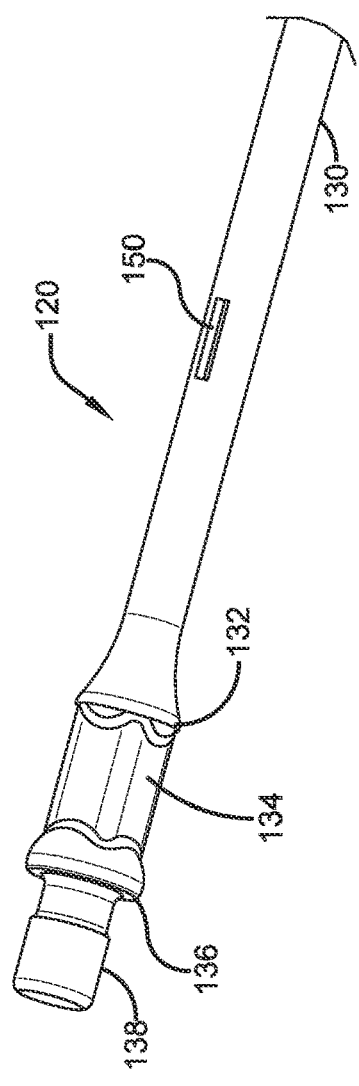
FIG. 4A-4C are side perspective views of the end of sucker rods having RFID tags attached thereto.
Figure 4C:
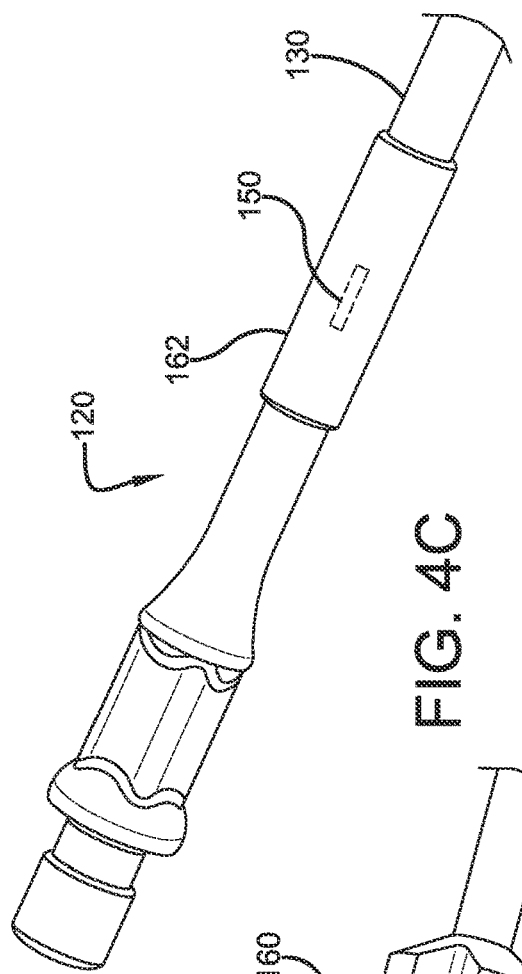
Figure 4B:
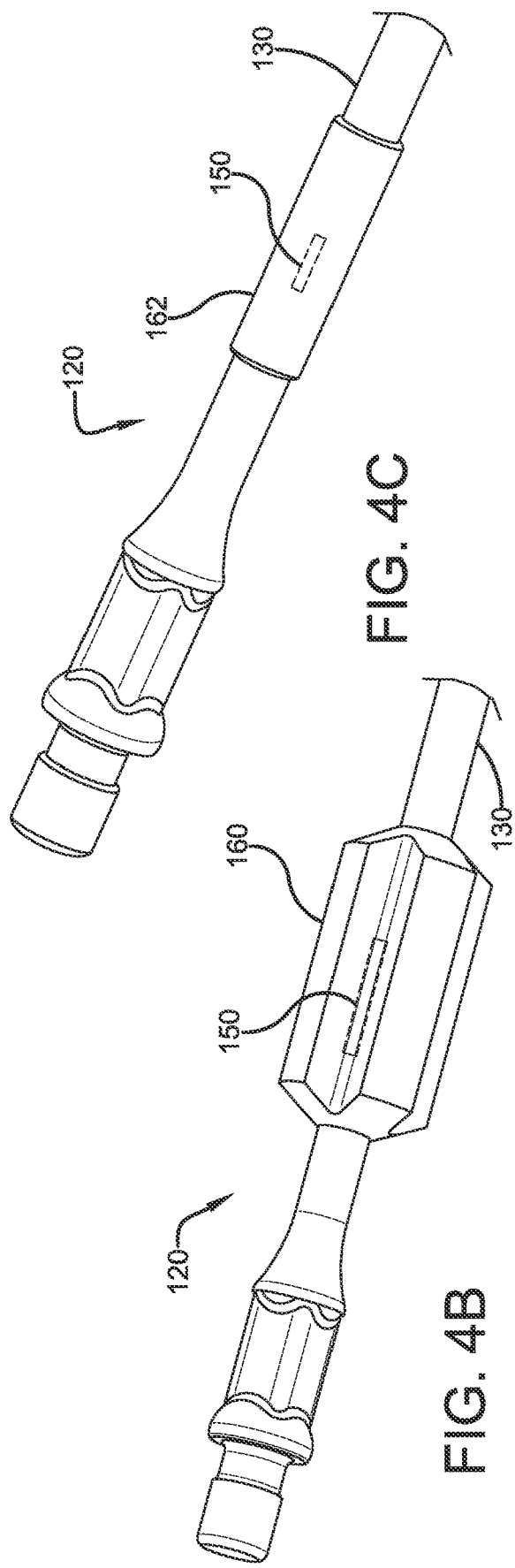

Specific embodiments are shown in FIGS. 4A-4C. In FIG. 4A, assembly 120 includes a sucker rod 130 having an RFID tag 150 disposed on a surface thereof. RFID tag 150 can be affixed with an adhesive to the exterior surface of sucker rod 130. This may at least be suitable for tracking the inventory and delivery of the rods.

In other embodiments, assembly 120 can be adapted to withstand use after being placed downhole in an installation. For example, as shown in FIGS. 4B-4C, assembly 120 includes a sucker rod 130, a radio frequency identification tag 150, and a protective element 160, 162, which may be referred to as securements 160, 162 disposed on sucker rod 130 and securing tag 150 thereto. Protective elements 160, 162 enclose, encapsulate, or hold RFID tag 150 on rod 130. In FIG. 4B, protective element 160 is a centralizer or guide disposed on (e.g. over-molded on) rod 130. Tag 150 can be installed on or installed in element 160. In FIG. 4C, protective element 162 is a sleeve over-molded to protect and secure tag 150. In one or more embodiments, sleeve 162 can have a smooth cylindrical shape and may be constructed of a high impact material to withstand a shot peening operation during inspection of rod 130. As suggested above, it is common for guides to be removed during this form of inspection process. Due to its shape, however, protective element 162 could easily be identified and left in place during the inspection process.

In one or more embodiments, the securements described herein (e.g. securements 160, 162) can he fabricated from thermoplastic or thermosetting materials. As those skilled in the art appreciate, these polymeric materials are typically combined with other materials, such as fillers, plasticizers, oils, anti-degradants, and optional curatives to form a compound that is then fabricated into the securement. Exemplary thermoplastic materials that may be used include, without limitation, high-performance thermoplastics such as polyphenylene sulfide (PPS), polyphthalamide (PPA), polytetrafluoroethylene (PTFE), polyketones, polyimides, and poly (ether sulfones).

Figure 5A:
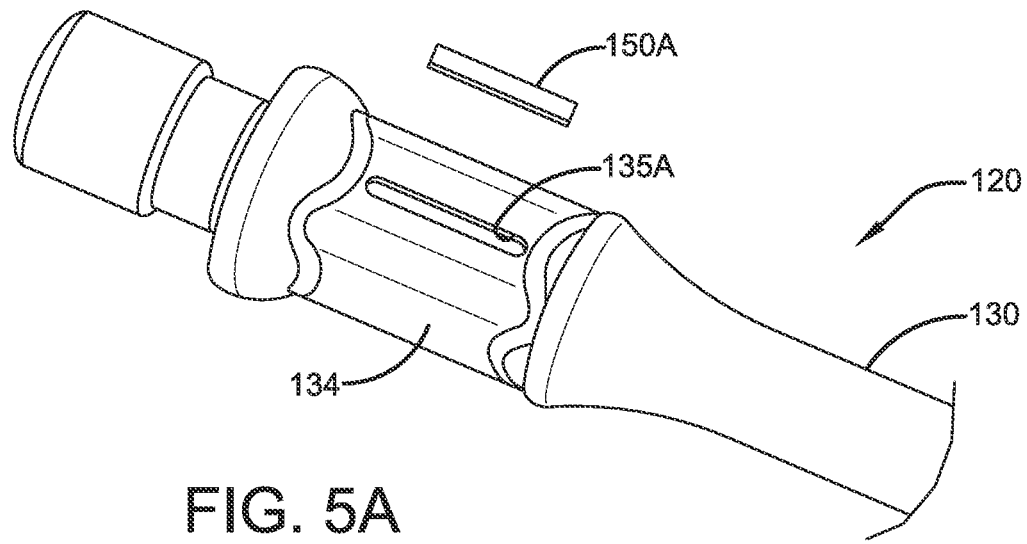
FIG. 5A-5B is a side perspective view of an end of a sucker rod having an RFID tag potted in an aperture on the rod.
Figure 5B:
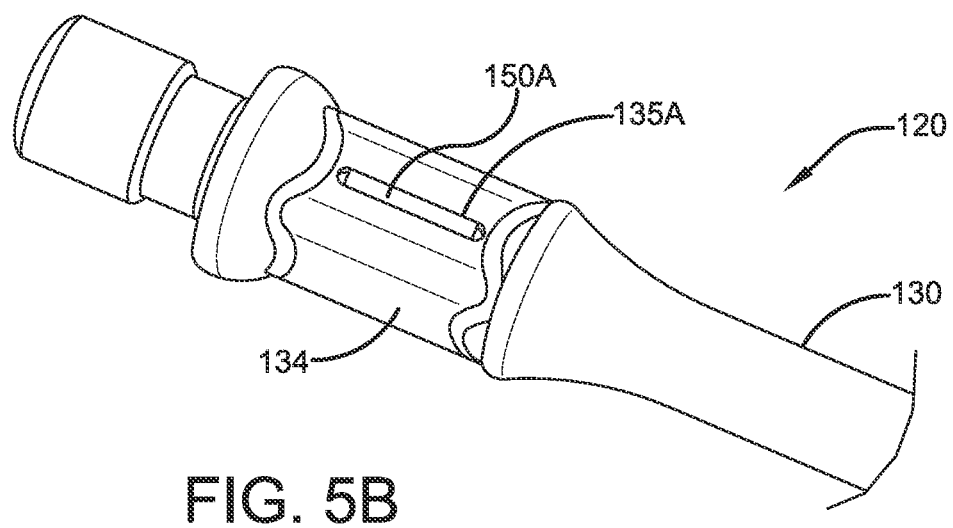

In other embodiments, which can be explained with reference to FIGS. 5A-5B, assembly 120 includes a sucker rod 130 including an aperture, blind hole, recess, indentation, or cutaway, and a radio frequency identification tag 150 secured in the aperture. Tag 150 can be potted in the aperture in rod 130. Although the slender section of rod 130 could have an aperture, aperture 135a. is desirably positioned within a wrench square 134. As shown, aperture 135a is an indentation or slot. Although it could be machined, slot 135a can be forged into wrench flat 134. The slot geometry for aperture 135a can offer low stresses due to the orientation and rounded corners. Also, the tongs used on wrench square 134 to make up rod connections typically engage the corners of square 134 so that RFID tag 150 positioned in the flat would remain unmolested.

Figure 6:
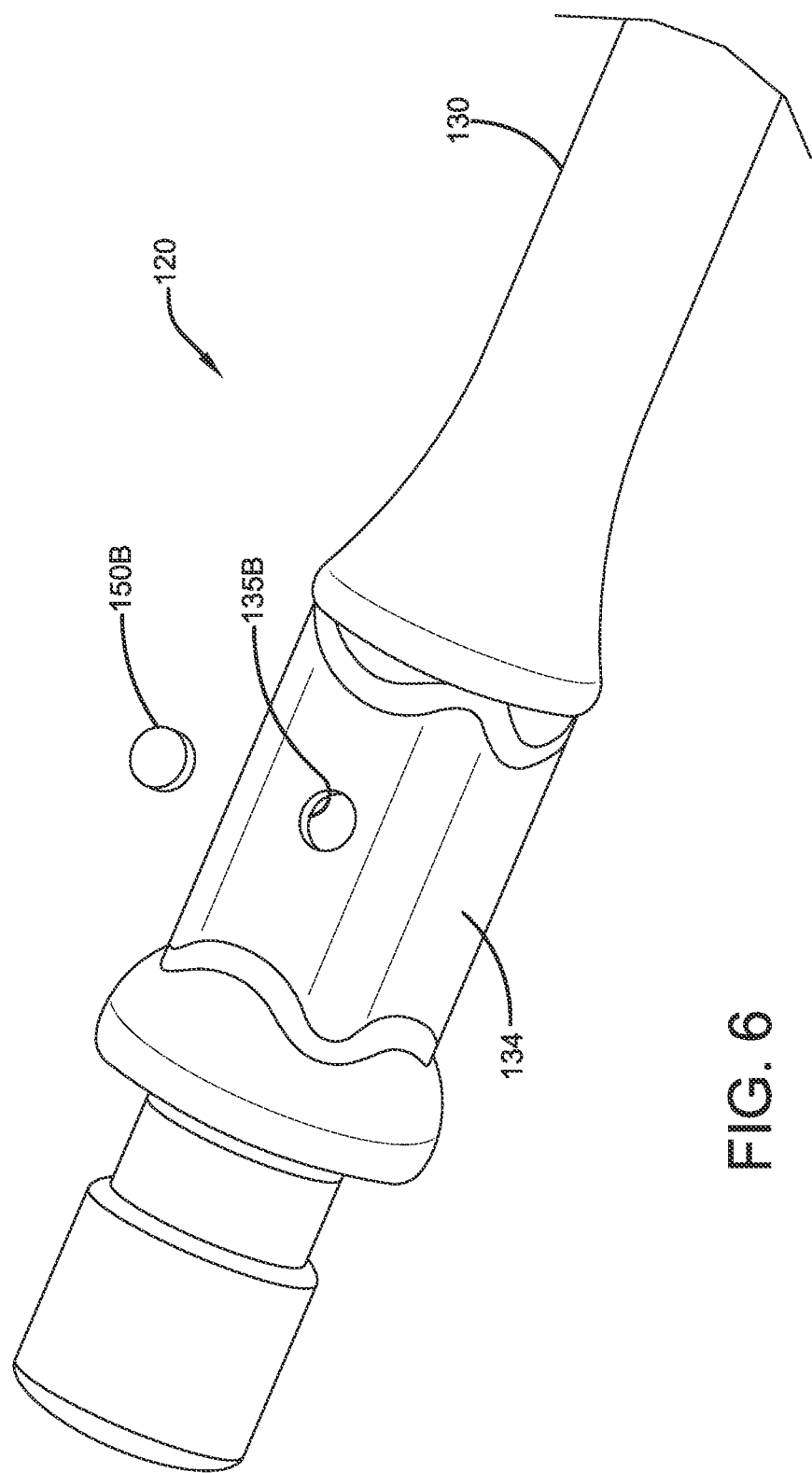
FIG. 6 is a side perspective view of an end of a sucker rod having an RFID tag potted in another type of aperture on the rod.

Other embodiments are shown in FIG. 6, which illustrates an arrangement for potting a differently shaped RFID tag 150 in a round aperture 135b on rod 130. This alternate geometry can also provide low stress concentrations. As will be appreciated, the size of RFID tag 150 essentially dictates how much antenna tag 150 includes, which governs the distance at which tag 150 can be read. In general, it may be desirable that tag 150, as well as other tags disclosed herein, can be read by a reader within one or several feet of tag 150.

Figure 7A:
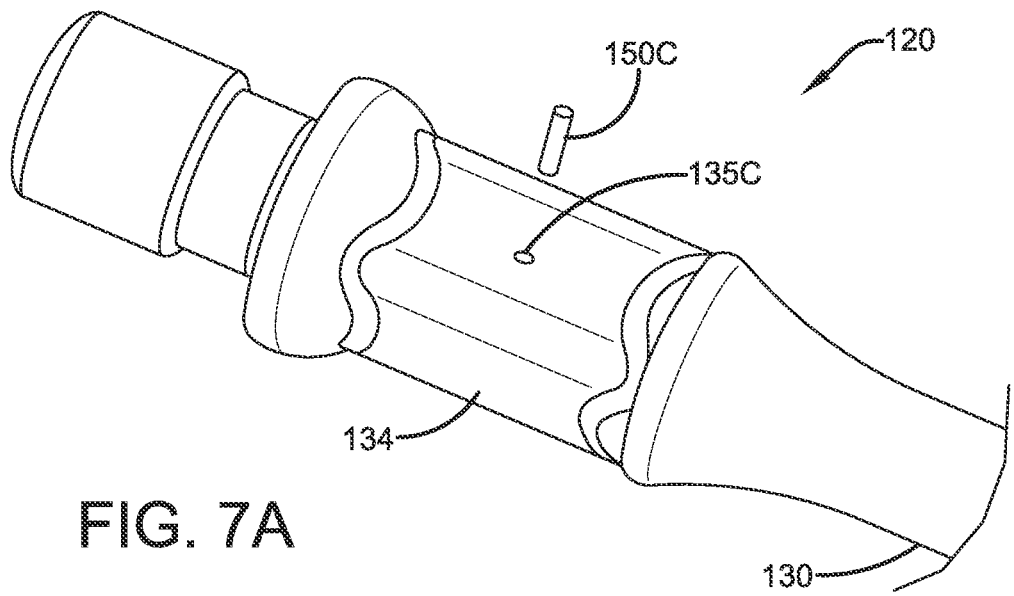
FIGS. 7A-7B is a side perspective view of an end of a sucker rod having an RFID tag potted in yet another aperture on the rod.
Figure 7B:
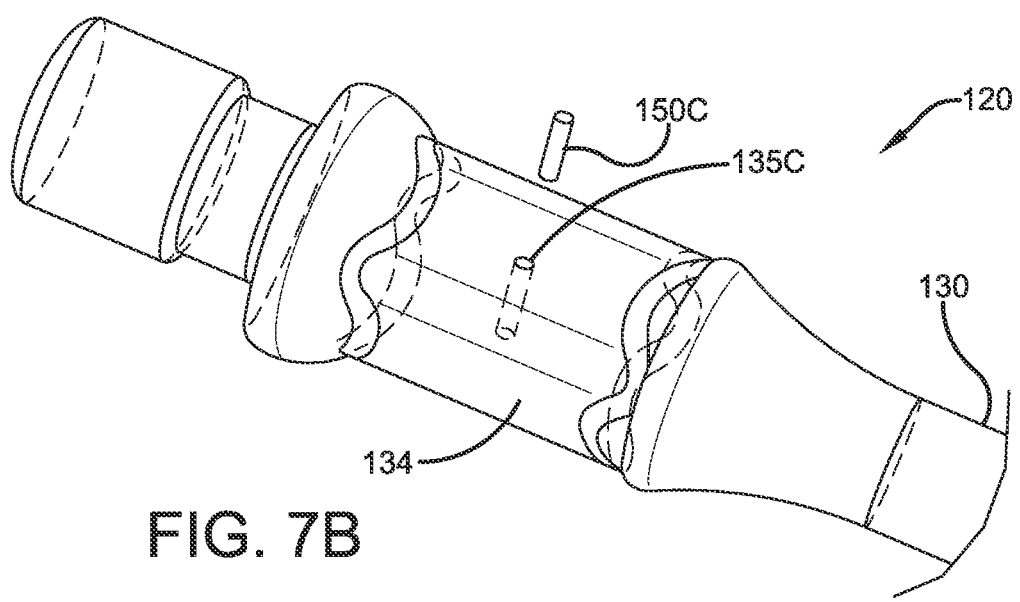

In yet other alternative embodiments, which are shown in FIGS. 7A-7B, assembly 120 includes a cylindrical RFID tag 150c potted in a blind or through hole 135c on rod 130. Again, this alternate geometry can also provide low stress concentration.

Figure 8A:
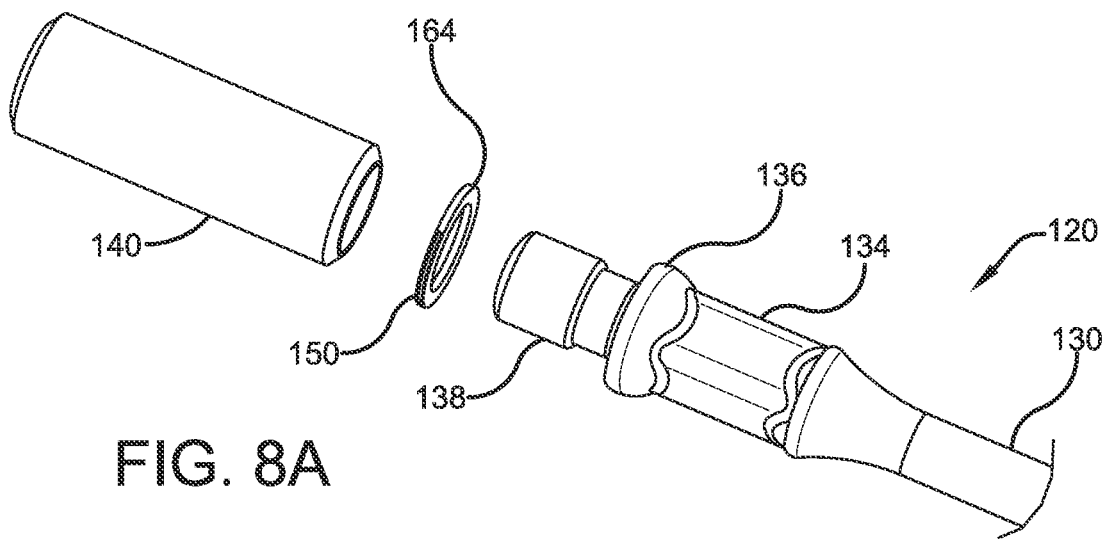
FIGS. 8A-8B is a side perspective view of an end of a sucker rod having an RFID tag incorporated into a washer for the connector.
Figure 8B:
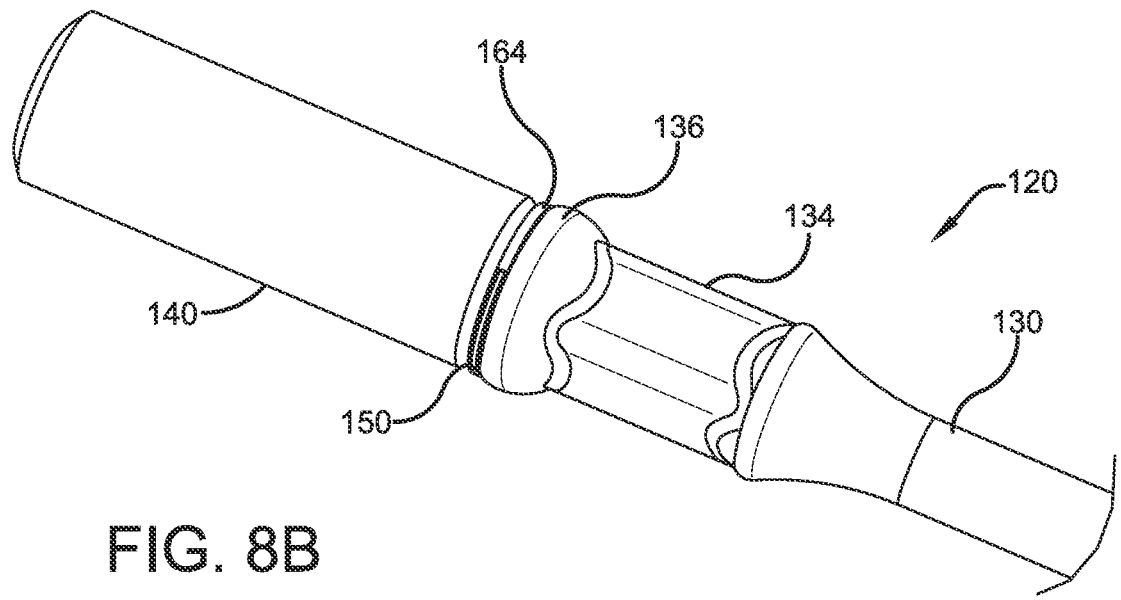
Figure 9:
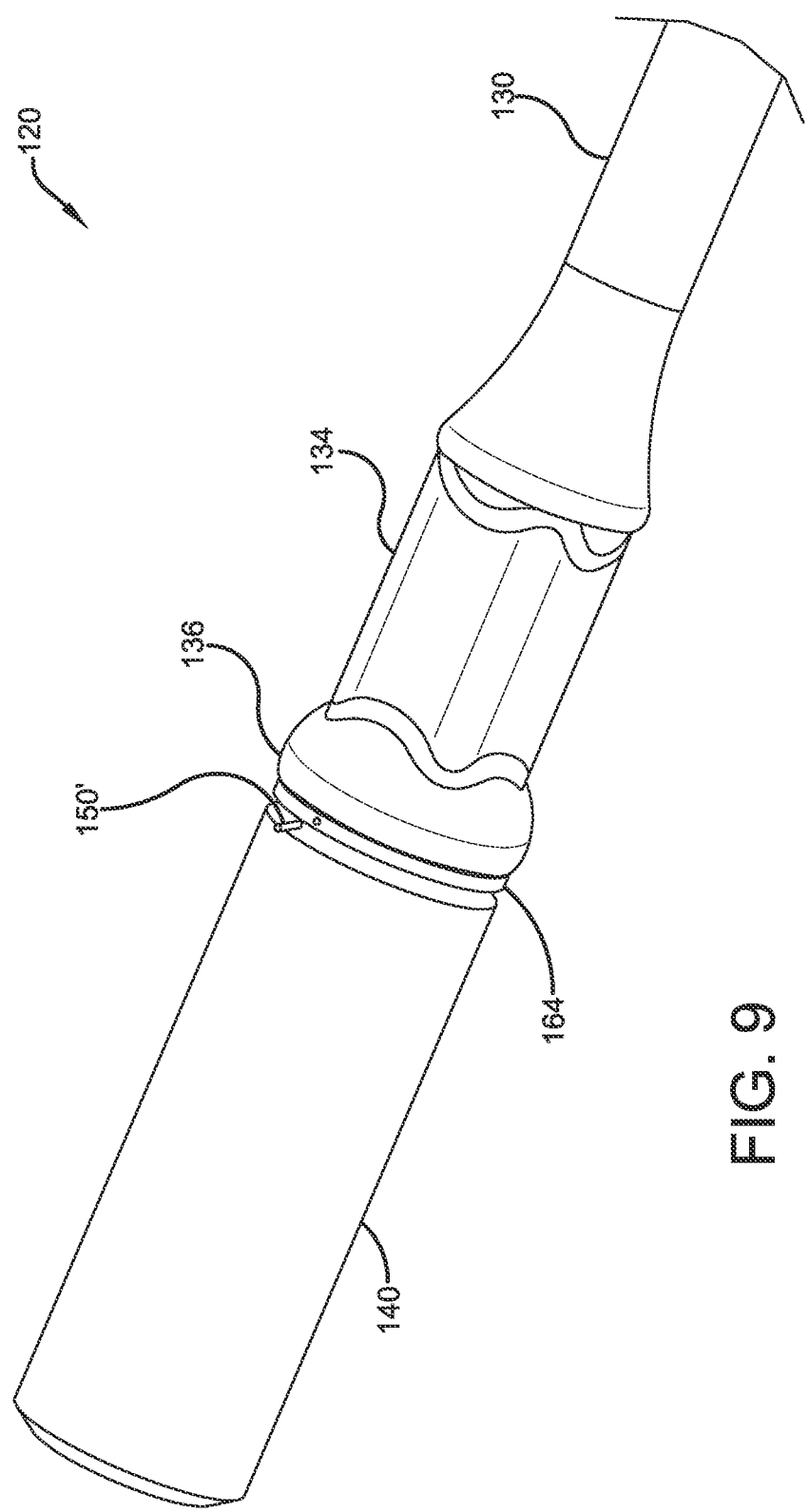
FIG. 9 is a side perspective view of an end of a sucker rod having an um tag incorporated into another washer for the connector.

In one or more embodiments, RFID tags can also be incorporated into assembled connections of a rod and a coupling. In these embodiments, the assembly includes a sucker rod having a pin extending from a shoulder for connection to a coupling; a washer disposed on the pin adjacent the shoulder, and an RFID secured to the washer. For example, FIGS. 8A-8B illustrate an assembly 120 including a sucker rod 130 having an RFID tag 150 incorporated into a washer 164 for insertion on a pin 138. For assembly, washer 164 may be designed to press fit with its internal diameter over pin 138, which may have a step for this purpose. Washer 164 is then trapped between coupling 140 and pin shoulder 136 as shown in FIG. 6B. In particular embodiments, tag 150 may be potted into a circumferential slot in washer 64 as shown in FIGS. 8A-8B. Alternatively, as shown in FIG. 9, RFID tag 150 is oriented radially into washer 164. Either way, washer 164 is may be composed of a comparable material to that used for sucker rod 130 and coupling 140, and the washer 164 has suitable, lubricant free faces for the frictional make up with the coupling 140 and the shoulder 136.

In yet other embodiments, as shown in FIGS. 10A-10C, an assembly 120 may include a sucker rod 130, an RFID tag 50 disposed on the sucker rod 130, and a sleeve 166 heat shrunk about sucker rod 130 and securing tag 150 thereto. During assembly, RFID tag 150 is placed on the surface of rod 130, optionally with the use of an adhesive. Heat shrink element 166, which may also be referred to as sleeve 166, is then slid over the forged end of rod 130. Once sleeve 166 is in position, heat is applied to shrink sleeve 166 and thereby secure tag 150 to rod 130. Sleeve 166 may be composed of a thermoplastic, such as polyphenylene sulfide (PPS), polyketone, polyphthalamide (PPA), polytetrafluoroethylene (PTFE), or of another high-impact and high-temperature resistant material. A heat gun or other device can be used to apply the heat to shrink fit sleeve 166 in place, and sleeve 166 can be configured or formulated with a predetermined ratio of shrinkage.

Figure 11A:
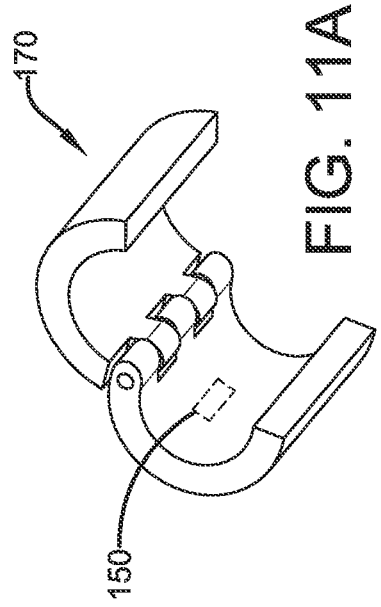
FIGS. 11A-11C is a side perspective view of an end of a sucker rod having an RFID tag supported on the rod with a clamp.
Figure 11B:
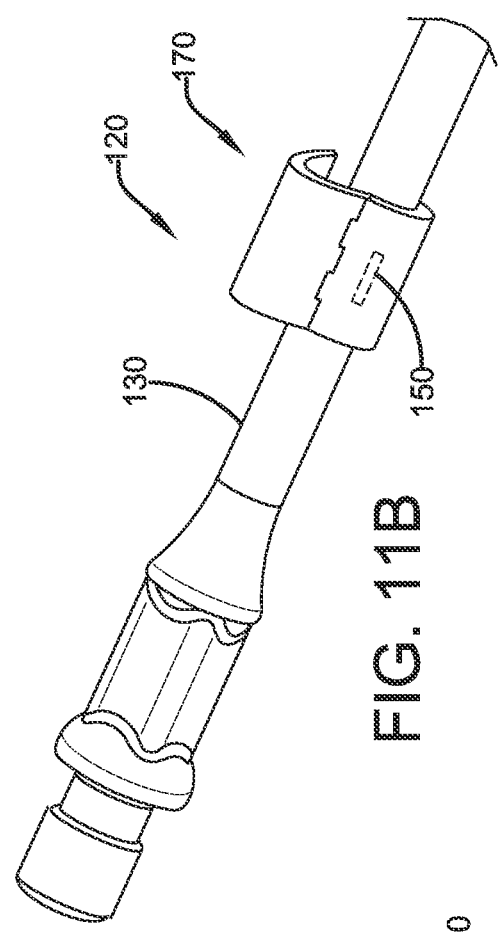
Figure 11C:
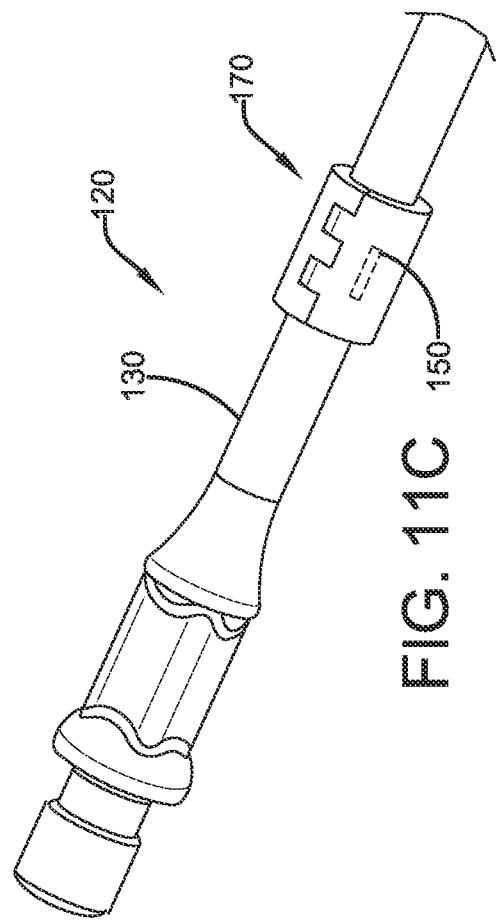

In other embodiments, the assembly includes a sucker rod, a clamp secured to the sucker rod, and an RFID tag disposed on the clamp or secured in place by the clamp. In one or more embodiments, the clamp can include a hinged clamshell, interconnecting parts, a swage collar, or a clip. An exemplary embodiment is shown in FIGS. 11A-11C, which illustrate an assembly 120 including a sucker rod 130 having an RFID tag 150 supported on rod 130 with a clamp 170. Clamp 170 has the form of a hinged clamshell made of a polymeric material such as a thermoplastic (e.g. polyketone, polyphenylene sulfide (PPS), polyphthalamide (PPA), polytetrafluoroethylene (PTFE), or of another high-impact and high-temperature resistant material). Clamshell clamp 170 may have adhesive lining on its inside surface or can having a lining material that can be heat activated. RFID tag 150 may be molded into clamshell clamp 170. Alternatively, RFID tag 50 may be placed onto rod 130 prior to installation in which case clamshell clamp 170 may include a relief pocket for tag 150. Further still, tag 150 may be potted in an aperture on clamshell clamp 170.

Figure 12A:
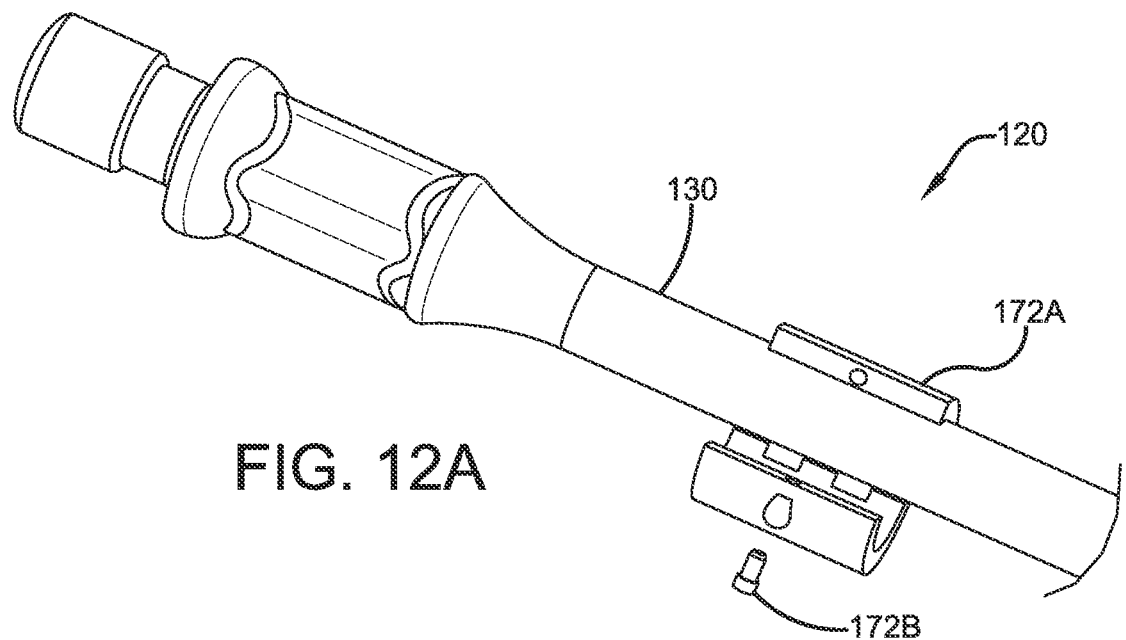
FIGS. 12A-12B is a side perspective view of an end of a sucker rod having an RFID tag supported on the rod with another type of clamp.
Figure 12B:
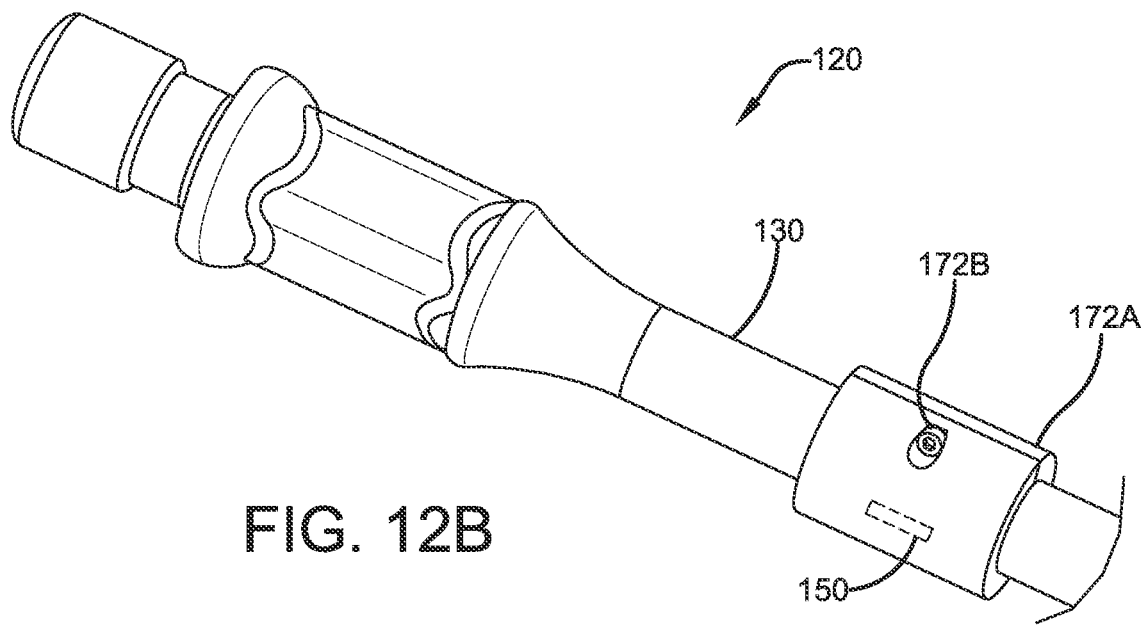
Figure 13A:
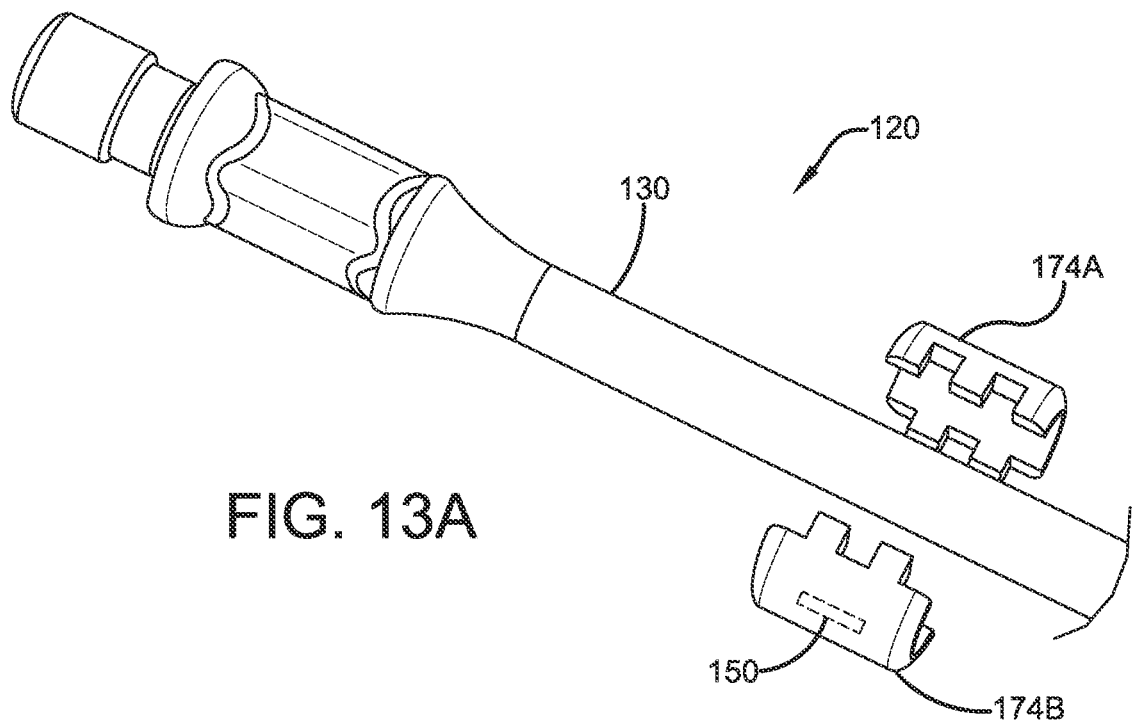
FIGS. 13A-13B is a side perspective view of an end of a sucker rod having an RFID tag supported on the rod with yet another type of clamp.
Figure 13B:
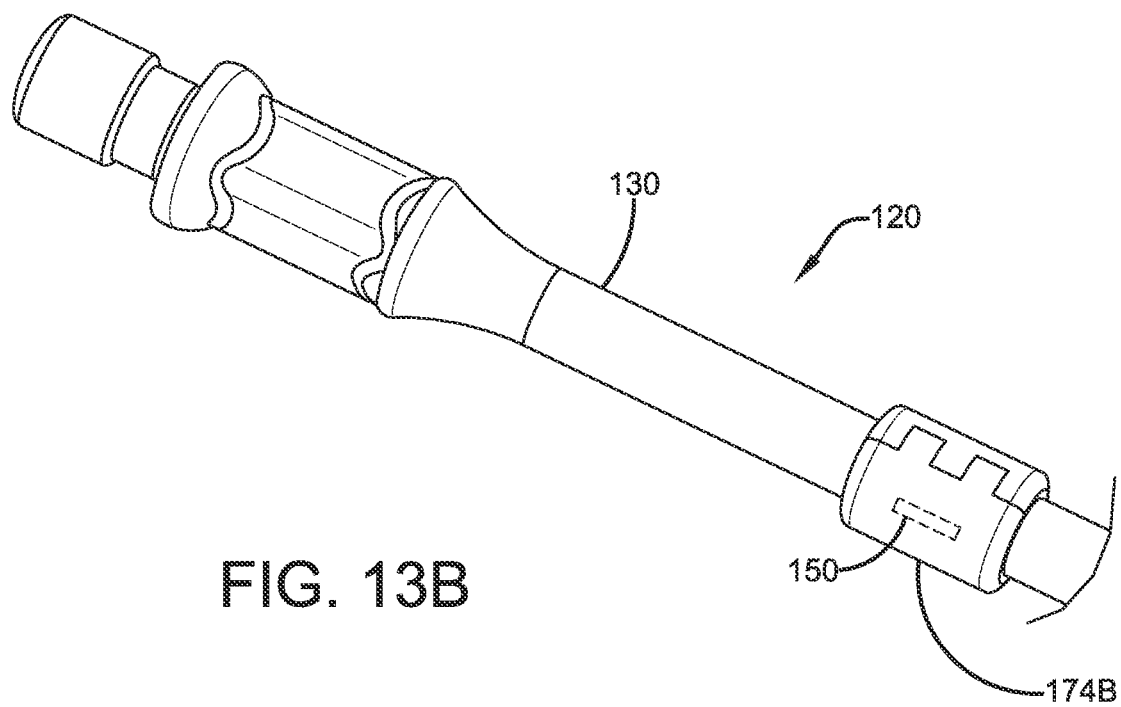

Another type of clamp can be explained with reference to FIGS. 12A-12B, which illustrate an assembly 120 including a sucker rod 130 having an RFID tag 150 supported on rod 130 with a clamshell 172a that is secured with a fastener 172b. Alternatively, as shown in FIGS. 13A-13B, RFID tag 150 is supported on rod 130 with a mating sleeve having interlocking parts 174a-b. Again, clamshell 172a of FIGS. 12A-12B and mating sleeve parts 174a-b of FIGS. 13A-13B can be made of a polymeric material such as a thermoplastic (e.g. polyketone, polyphenylene sulfide (PPS), polyphthalamide (PPA), polytetrafluoroethylene (PTFE), or of another high-impact and high-temperature resistant material). In particular embodiments, clamshell 172a or parts 174a-b may include an adhesive lining on its inside that may optionally be heat activated. RFID tag 150 may be molded into assembly 120 or placed onto rod 130 prior to installation so that clamshell 172a or mating sleeve parts 174a-b have a relief pocket. The mating of sleeve parts 174a-b may also be secured by mechanically mating (e.g. "snapping") the halves together.

Figure 14A:
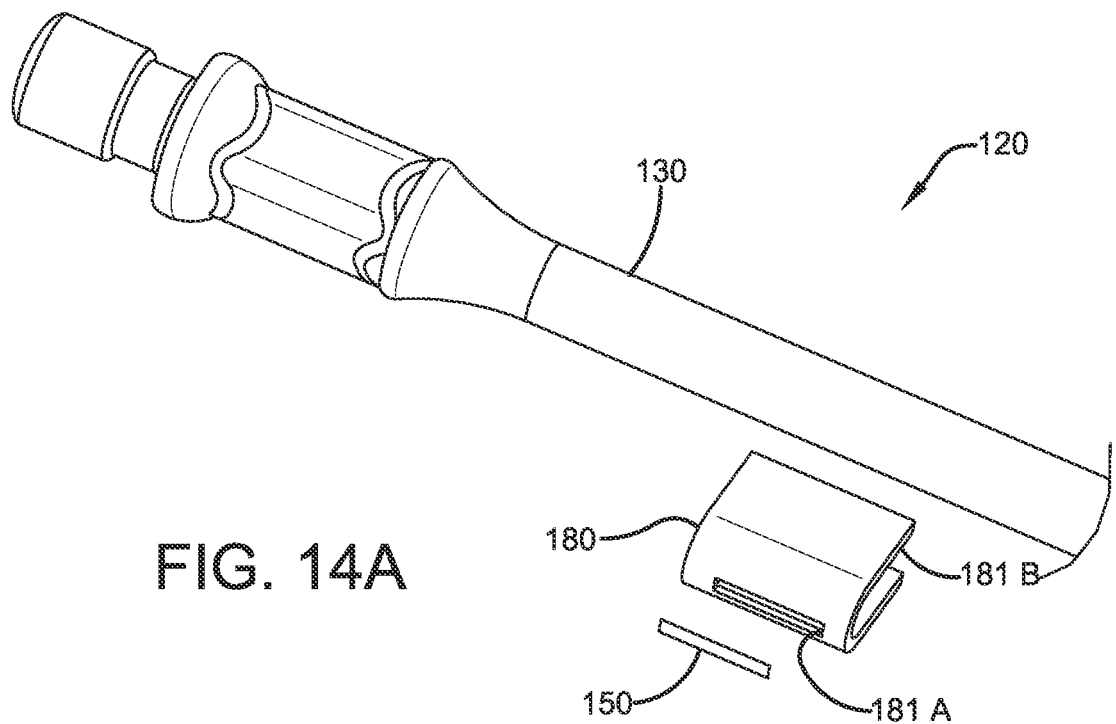
FIGS. 14A-14B is a side perspective view of an end of a sucker rod having an RFID tag supported on the rod with a clip.
Figure 14B:
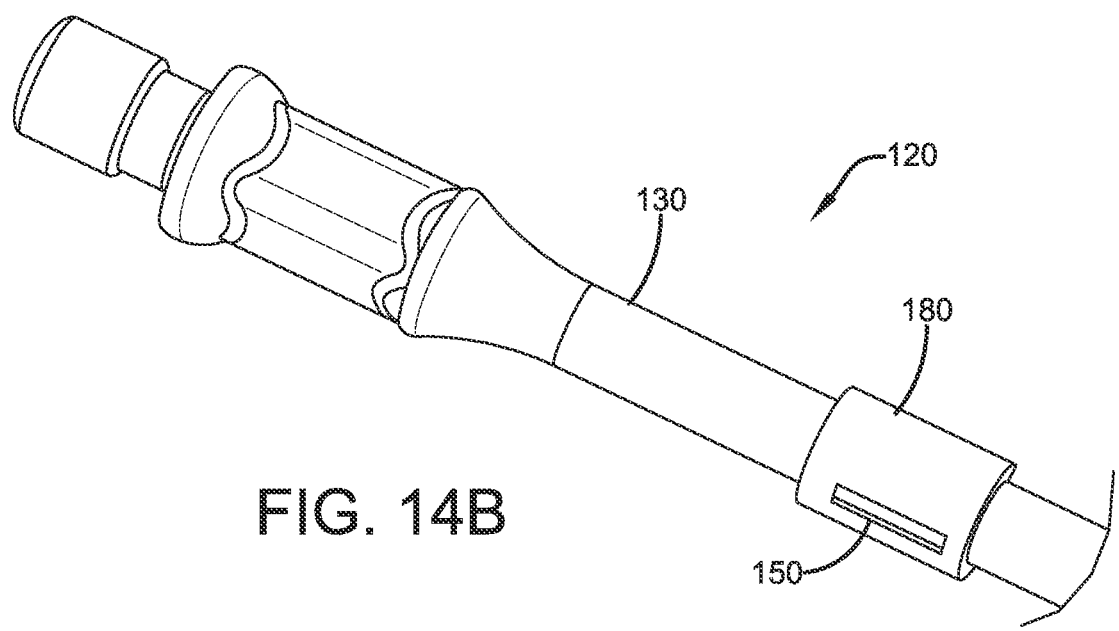

Still other embodiments can be described with reference to FIGS. 14A-14B, which show assembly 120 including a clip 180 that is adapted to fit on or be secured to a sucker rod 130 and support an RFID tag 150. RFID tag 150 may be potted in a relief 181a on clip 180. Clip 180 can be composed of a metallic material, and force can be applied to tabs 181b of clip 180 (e.g. by way of a handheld tool) to thereby secure clip 180 to sucker rod 130. Adhesive may be used to help secure clip 180 to rod 130. Because clip 180 is made of metal, consideration of galvanic corrosion between clip 180 and the rod 130 is desirably considered. For this reason, clip 180 may be lined or coated with an insulating plastic material to prevent galvanic issues.

Figure 15A:
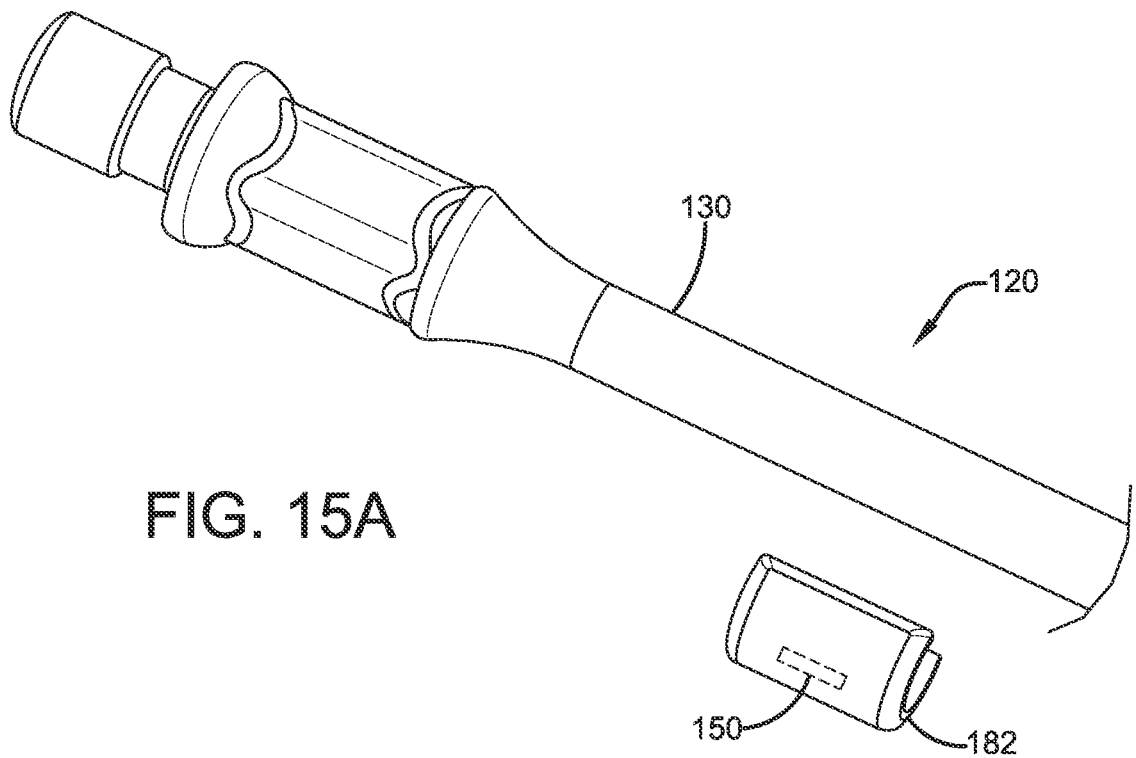
FIGS. 15A-15B is a side perspective view of an end of a sucker rod having an RFID tag supported on the rod with another type of clip.
Figure 15B:
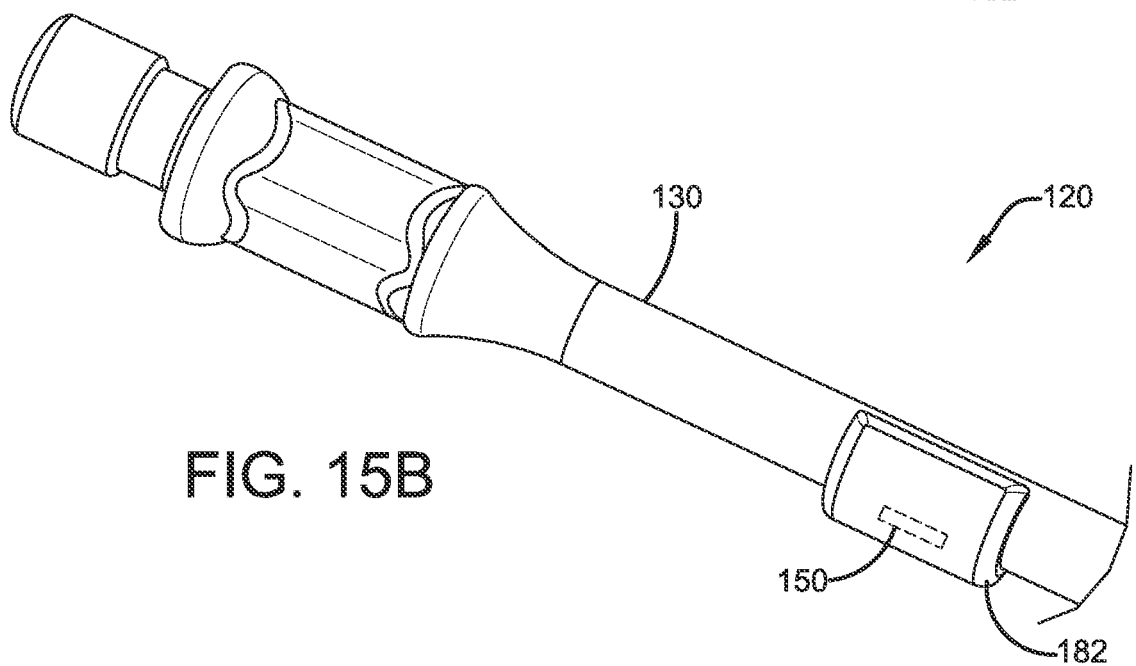
Figure 16A:
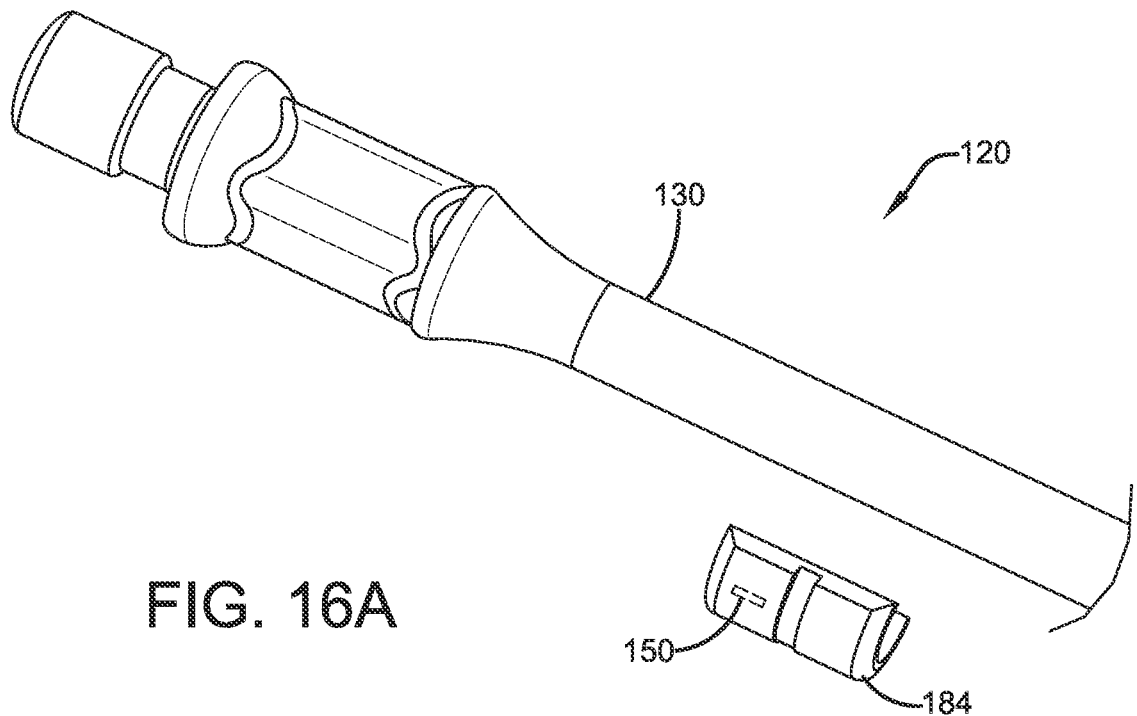
FIGS. 16A-16B is a side perspective view of an end of a sucker rod having an RFID tag supported on the rod with yet another type of clip.
Figure 16B:
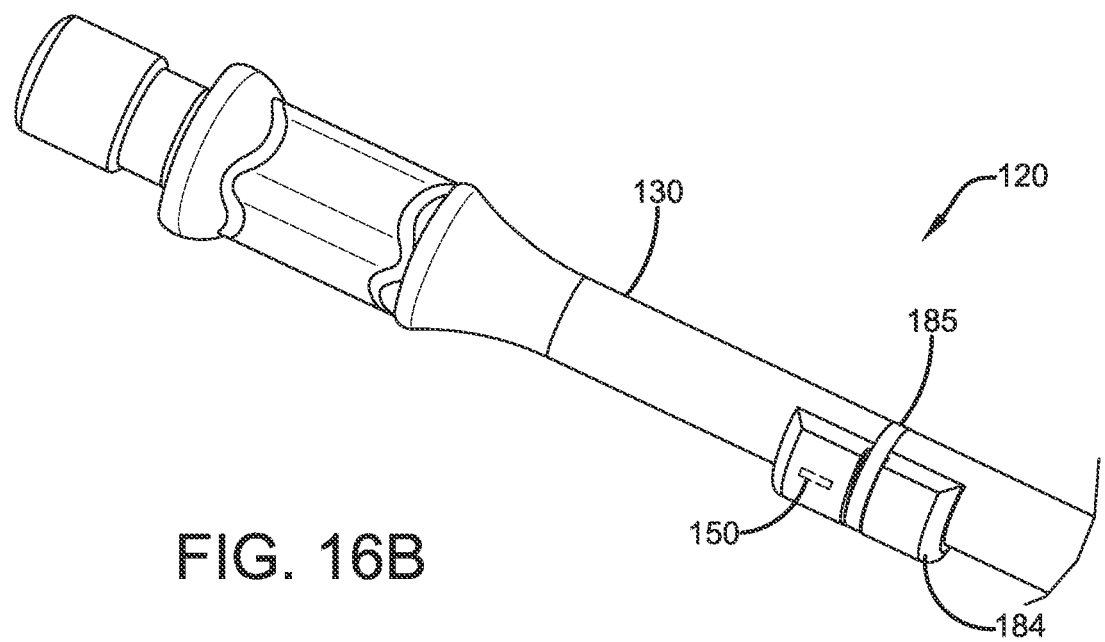

FIGS. 15A-15B illustrate another type of clip or swage collar 182, which is designed with a reduced opening (as compared to rod 130) allowing collar 182 to be snapped onto rod 130. Collar 182 may incorporate adhesive/resin for greater retention. As shown in FIG. 16A-16B, a clip or collar 184 may incorporate a groove allowing for additional banded retention. A band 185, which may be fabricated from metallic or thermoplastic material may be secured around clip 184 and rod 130 with a crimping tool. In either of these embodiments, RFID tag 150 may be molded into the material of clip or collar 182 or 184, or RFID tag 150 may be protected by a recess of clip or collar 182 or 184. Alternatively, clip 180 can be secured to rod 130 using a heated application tool. Clip 180 can be composed of a thermoplastic material, and the application tool can heat clip 180, causing tabs 181b to collapse around sucker rod 130. Clip 180 may incorporate a heat activated resin for additional retention.

Figure 17A:
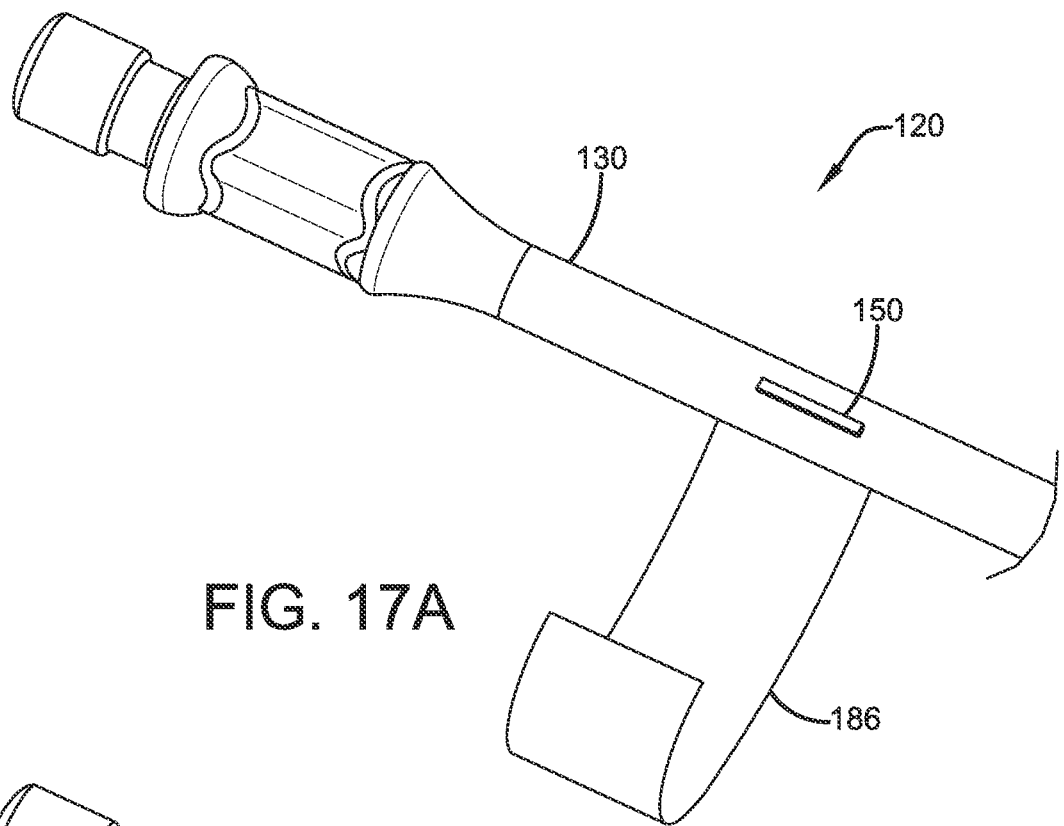
FIGS. 17A-17B is a side perspective view of an end of a sucker rod having an RFID tag supported on the rod with a band.
Figure 17B:
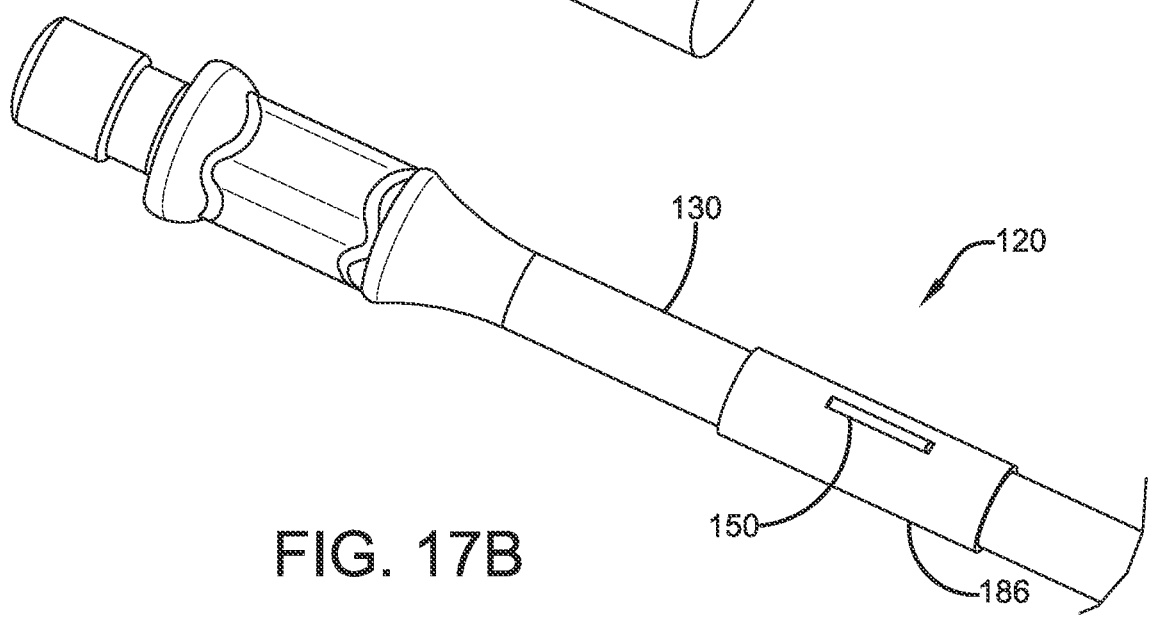
Figure 18A:
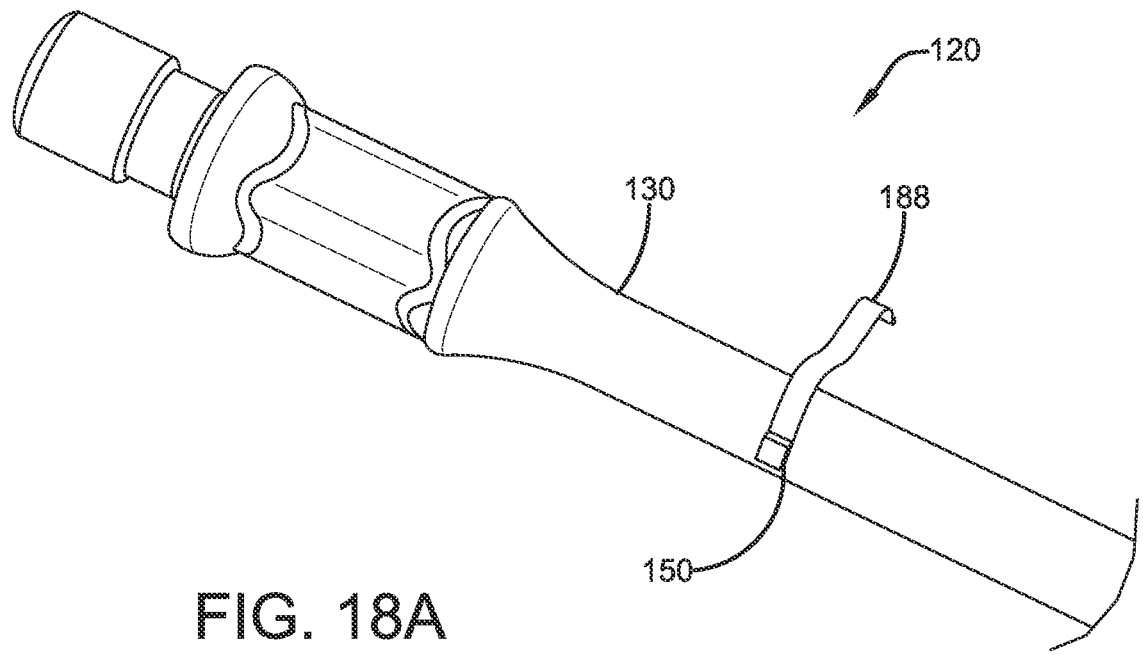
FIGS. 18A-18B is a side perspective view of an end of a sucker rod having an RFID tag supported on the rod with another type of band.
Figure 18B:
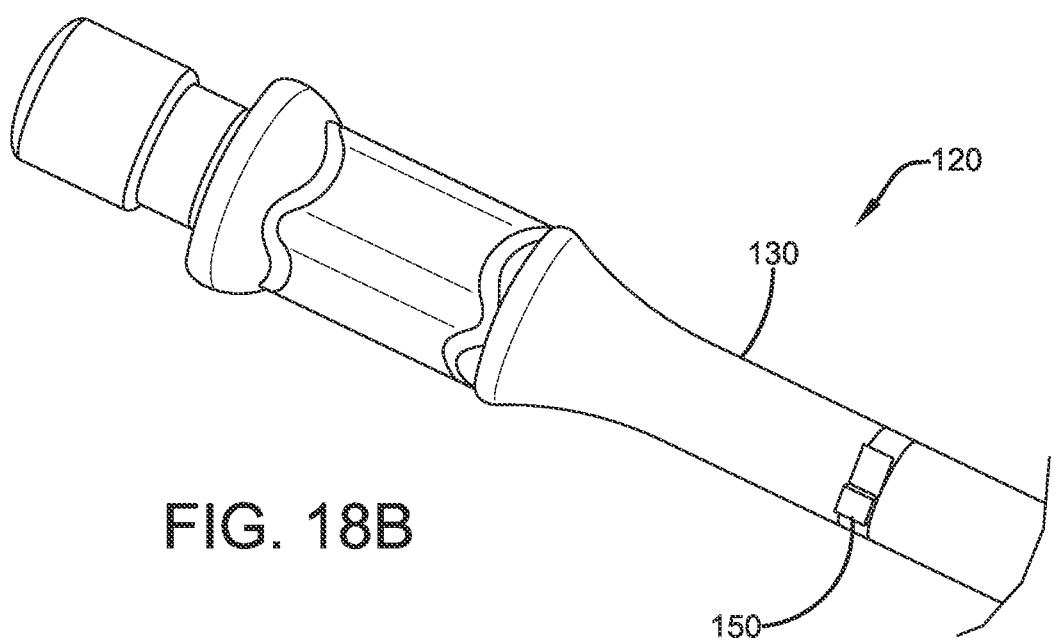

FIGS. 17A-17B illustrate yet another embodiment where assembly 120 includes a sucker rod 130, a band 186 secured to the sucker rod, and an RFID tag 150 secured in place by the band. For example, RFID tag 150 may be supported on rod 130 with a band 186 including a high-performance tape. Once applied, band 186 may be cured or vulcanized using heat or ultraviolet (UV) means. As shown in FIGS. 18A-18B, RFID tag 150 is supported on rod 130 with another type of band, such as a plastic or metal zip or lock tie 188. Tie 188 may be applied by hand or by using a crimp tool.

Figure 19:
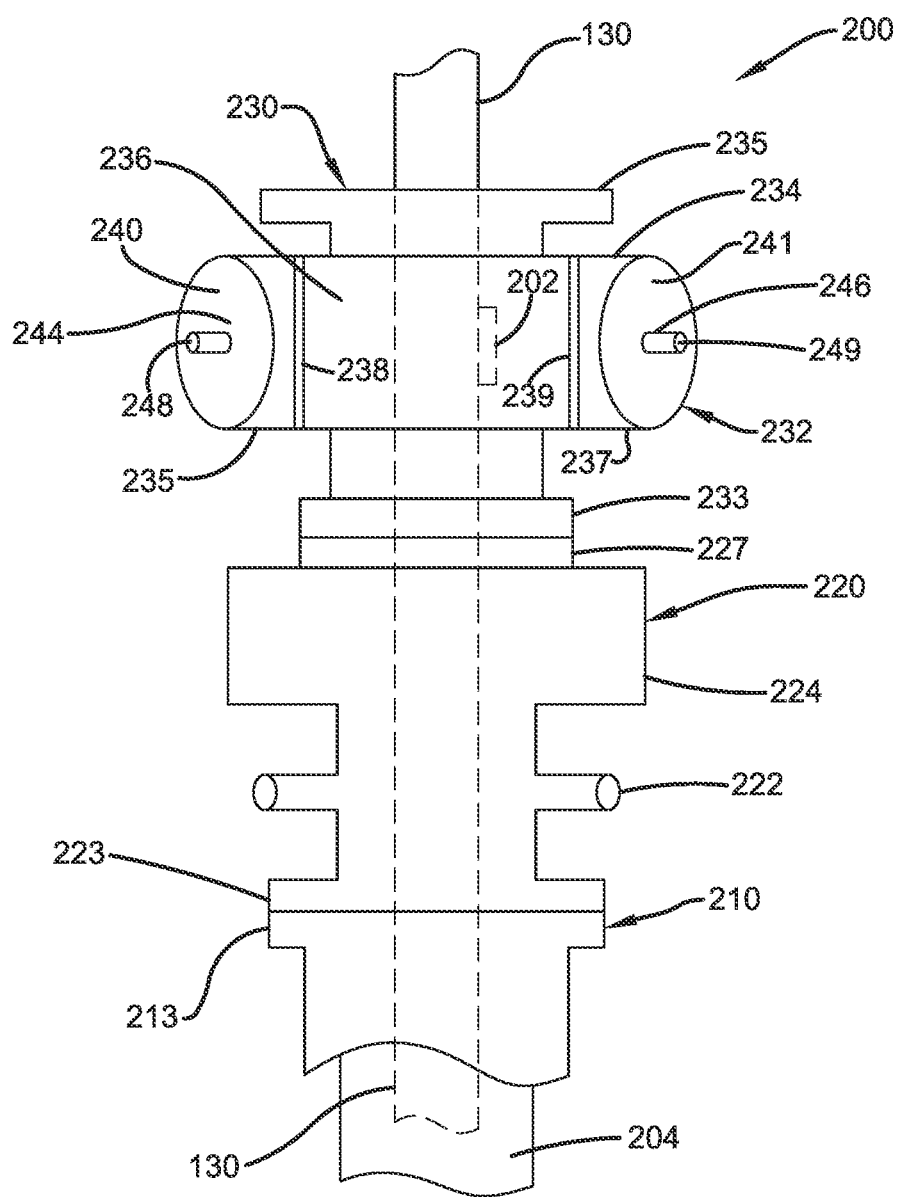
FIGS. 19A-19B is a side perspective view of an end of a sucker rod having an RFID tag supported on the rod with a spring.

In yet other embodiments, which are shown in FIGS. 19A-19B, assembly 120 includes a helical coil element or spring 190, an RFID tag 150 disposed on spring 190, and spring 190 is associated with a rod 130 by circumscribing rod 130 (e.g. wound around). In certain embodiments, helical coil element or spring 190 can provide an antenna or signal transmission means for RFID tag 50. In particular embodiments, spring 190 is secured to sucker rod 130 by being wound around rod 130 with tension from the spring providing sufficient mating forces. In other embodiments, spring 190 may be used in conjunction with a heat shrinkable sleeve as outlined above in FIGS. 10A-10C.

Figure 20A:
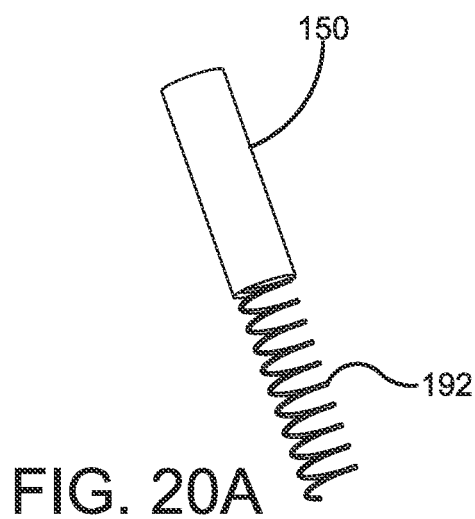
FIGS. 20A-20C is a side perspective view of an RFID tag disposed in an aperture in the end of the rod's pin.
Figure 20B:
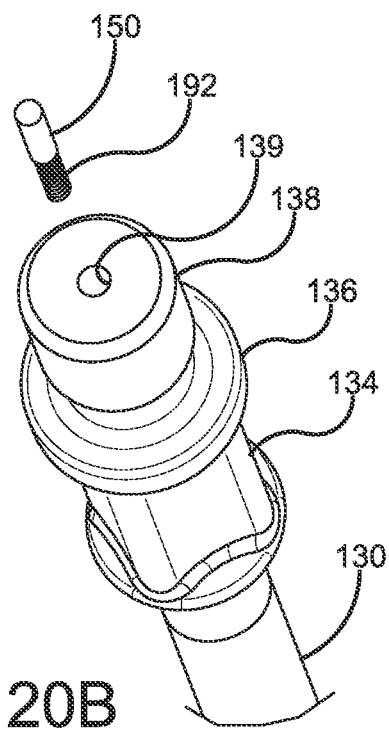
Figure 20C:
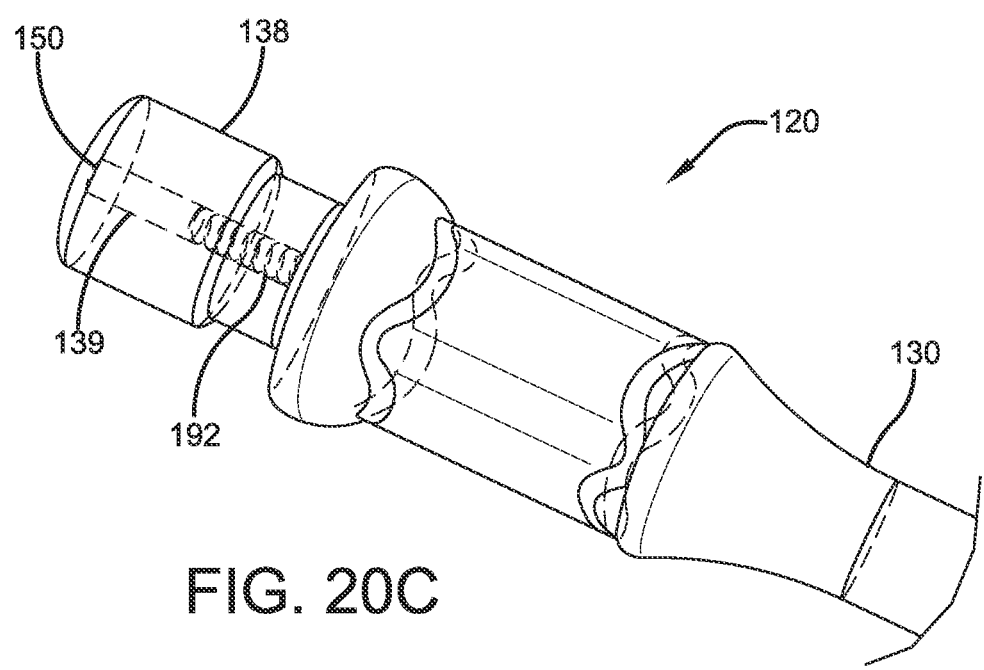

Other embodiments are shown in FIGS. 20A-20C, which illustrates assembly 120 including an RFID tag 150 that is disposed in an aperture or blind hole 139 in an end portion of pin 138 of rod 130. A metallic member or coil 192 contacts rod 130 at a terminal end of blind hole 139 allowing for signal transmission along the length of rod 130. RFID tag 150 can be inserted and potted in place with epoxy or similar material. Typically, RFID tag 150 in this location would not transmit a signal due to the surrounding metal, especially when rod 130 is connected to a coupling (e.g. coupling 140). However, metallic coil 192 can assist with transmission difficulties by providing electrical contact between tag 150 and the metallic material of rod 130.

Tag Reading When Running and Pulling Production Equipment

As suggested above with reference to FIG. 1, aspects of the invention include reading the RFID tags associated with the production equipment at the time the equipment is run into the well. In these or other embodiments, aspects of the invention also include reading the RFID tags associated with the production equipment at the time the equipment is pulled from the well. Accordingly, aspects of the invention include RFID reader systems or assemblies adapted to read RFID tags at or proximate to the wellhead while the RFID tags associated with the production equipment is run into or pulled from the well. According to aspects of the invention, the production equipment can be run into or pulled from the well using conventional techniques.

In one or more embodiments, a wellhead RFID reader system is positioned at or near the top of the wellbore (i.e. at the wellhead). In one or more embodiments, the wellhead RFID reader system can be mounted directly to the well head, or in other embodiments, it can he mounted to a blowout preventer or blowout preventer system mounted to the wellhead.

Figure 21:
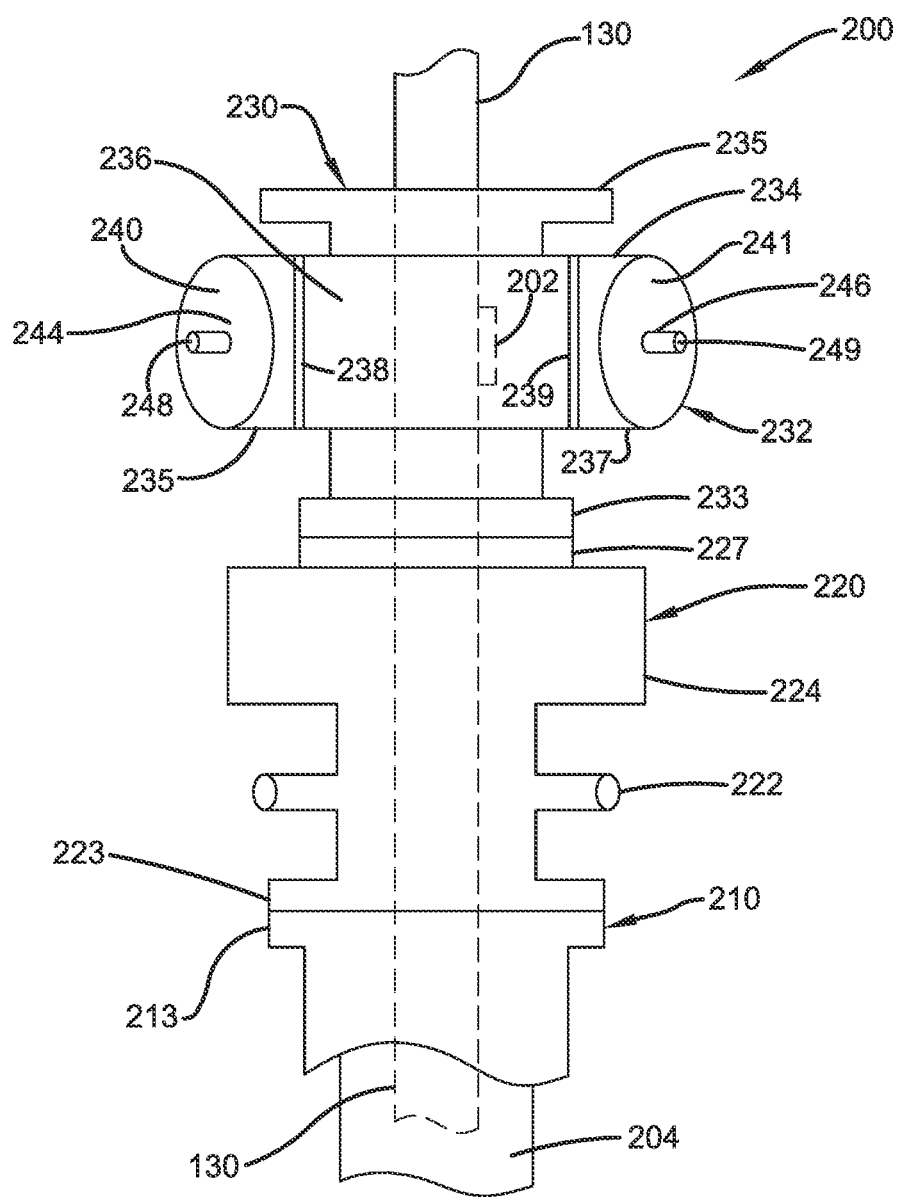
FIG. 21 is a side cross-sectional view of a wellhead assembly according to one or more embodiments of the present invention.

An exemplary wellhead RFID reader system can be described with reference to FIG. 21, which shows a wellhead system 200, which may also be referred to a wellhead assembly 200, including wellhead 210, blowout preventer system 220, and wellhead RFID reader system 230. Sucker rod 130, which includes RFID tag assembly 202, extends into wellbore 204 and through wellhead 210, blowout preventer system 220, and wellhead RFID reader system 230.

Wellhead assembly 210 and blowout preventer system 220, which may also be referred to as blowout preventer assembly 220, may be of the type that is conventional in the art. For example, blowout preventer system 220, which may also be referred to as BOP 220, may include one or more devices for preventing blowouts. System 220 may include, without limitation, an assembly of stacked blowout preventer devices, which may include those of the same or varying types. As those skilled in the art appreciate, it is common to employ a ram-type blowout preventer in conjunction with an annular-type blowout preventer. For example, and as shown in FIG. 21, blowout preventer assembly 220 includes, in stacked arrangement, a ram preventer 222 and a annular preventer 224 positioned above preventer 222. BOP 220 is secured (using appropriate fasteners) to wellhead 210 via complementary mounting or bolt flanges (e.g. bolt flange 53) of wellhead 210 and bolt flange 223 of BOP 220.

In one or more embodiments, wellhead RFID reader system 230 includes a housing 232 including bolt flange 233 that is secured (using appropriate fasteners) to a bolt flange 227 of BOP assembly 220. Housing 232 may also include a second bolt flange 235, which is opposite bolt flange 233 so as to be positioned vertically above bolt flange 233 and thereby forms the upper end of housing 232. In other embodiments, housing 232 may include a rim 235 or other structure defining the upper end of housing 232. Bolt flange 233 and flange or rim 235 define openings into housing 232 and collectively form a vertical passageway through RFID reader system 230. This vertical passageway, which may be generally cylindrical in configuration and is generally aligned with borehole 204 provides a passageway through RFID reader system 230 through which production equipment (e.g. sucker rod 130) can be run into or pulled from the well.

Housing 232 includes a body 234 that at least partially defines a detection chamber 236. Windows 238 and 239 are disposed within body 234 and further define chamber 236. Cap 240 is removeably attached at or to end portion 235 of body 234, and cap 241 is removeably attached at or to end portion 237 of body 234. RFID reader 244 is received by or otherwise attached to cap 240, and RFID reader 246 is received by or otherwise attached to cap 241. RFID readers 244, 246 are in communication with a data processor (not shown) which is in communication with appropriate data storage. With reference again to FIG. 1, information from RFID readers 244, 246 is communicated to data processing 21 and stored at database 23. With reference again to FIG. 21, RFID readers 244, 246 are connected to respective wires 248, 249 through which readers 244, 246 communicate, either directly or indirectly, with a data processor or communication system.

When sucker rod 130 (as well as tag assembly 202) is run into well bore 204, which takes place as a sucker rod string, each sucker rod 130 within the string passes through detection chamber 236. Where RFID tag assembly 202 includes a passive RFID tag, at least one of RFID reader 244 and RFID reader 246 provide appropriate electromagnetic energy to the tag to thereby power the RFID tag and permit the tag to transmit a signal back to at least one of RFID readers 244, 246. The same can take place as the sucker rod string is pulled from the wellbore. That is, while being pulled from wellbore 204, each sucker rod 130 passes through detection chamber 236 where RFID readers 244, 246 power each of the respective RFID tags and correspondingly detect the signals emitted by the tags.

Various modifications and alterations that do not depart from the scope and spirit of this invention will become apparent to those skilled in the art. This invention is not to be duly limited to the illustrative embodiments set forth herein.

What is claimed is:

1. A system for managing well production equipment, the system comprising:
 a) a production well within a production well field, where the production well includes a production tubing string, a pump in mechanical communication with a sucker rod string, and a wellhead assembly, where said sucker rod string is at least partially disposed within said production tubing, where the sucker rod string is in mechanical communication with a drive source that causes the sucker rod string to cycle, where the wellhead assembly includes a blowout preventer through which said sucker rod string is at least partially disposed, where the sucker rod string includes a plurality of sucker rods, where at least one of the sucker rods within the plurality of sucker rods carries an RFID tag secured thereto by a securement, where said securement is adapted to maintain the positioning and integrity of the RFID tag during a shot peening process;
 b) a subsystem adapted to gather information on one or more aspects of the sucker rod string during cycling of the sucker rod string, where said information includes the number of cycles experienced by the sucker rod string and loads or stresses experienced by the sucker rod string during cycling;
 c) an RFID tag reader disposed within said blowout preventer, said RFID tag reader being positioned to read the RFID tags associated with the at least one sucker rod including the RFID tag at the time the sucker rod is run into the well and the time the sucker rod is pulled from the well;

d) a data processing unit in communication with said RFID tag reader and said subsystem for gathering information on one or more aspects of the sucker rod string, where said data processing unit is configured to correlate information obtained from the subsystem for gathering information on one or more aspects of the sucker rod string with the with information obtained from the RFID reader relative to the at least one sucker rod including the RFID tag;

e) a storage facility adapted to store of a plurality of sucker rods, where the storage facility includes an RFID tag reader, said RFID reader positioned to read RFID tags associated with a one or more of the plurality of sucker rods as the one or more of the plurality of sucker rods leaves the storage facility, where said RFID tag reader associated with the storage facility is in communication with said data processing unit; and f) an inspection facility adapted to perform shot peening on sucker rods, where said inspection facility includes an RFID tag reader, where the RFID reader is positioned to read RFID tags associated with a one or more of the plurality of the sucker rods as sucker rods leaves the inspection facility, where said RFID tag reader associated with the inspection facility is in direct or indirect communication with said data processing unit.

2. The system of claim 1, where the RFID tag and the securement are adapted to withstand the loads caused by the cycling of the sucker rod string.

3. The system of claim 1, where the RFID tag and the securement is adapted to withstand the downhole environment.

4. The system of claim 1, where the data processing unit is in direct communication with said RFID tag reader and said subsystem for analyzing one or more aspects of the sucker rod string.

5. The system of claim 1, where the data processing unit is in indirect communication with said RFID tag reader and said subsystem for analyzing one or more aspects of the sucker rod string.

6. The system of claim 1, where the securement is fabricated from thermoplastic or thermosetting materials.

7. The system of claim 1, where the subsystem for gathering information on one or more aspects of the production well is adapted to gather information environmental conditions of the production well.

8. The system of claim 1, further comprising a data storage unit in communication with said data processing unit.

9. A process for managing well production equipment, the process comprising:

a) providing a plurality of sucker rods having an RFID tag secured thereto by a securement, where said securement is adapted to maintain the positioning and integrity of the RFID tag during a shot peening process;

b) providing a production well located within a production well field, said production well including a wellhead assembly and a production string disposed within the production well, where the wellhead assembly includes a blowout preventer that includes an RFID tag reader adapted to read RFID tags secured to sucker rods as sucker rods are run into and out of the well;

c) running the plurality of sucker rods into the well to provide a sucker rod string that is at least partially disposed within the production string,where said running includes running the sucker rods through the blowout preventer;

d) tracking the plurality of sucker rods as the plurality of sucker rods are run into the production well by receiving identity information from the RFID tag reader included within the blowout preventer, where said identity information includes information relative to the identity of the RFID tag that is read by the RFID tag reader;

e) cycling the production rod string to facilitate hydrocarbon production;

f) gathering information related to the production well during hydrocarbon production as the sucker rod string is cycled, said information including the number of cycles experienced by the sucker rod string and loads or stresses experienced by the sucker rod string;

g) running the plurality of sucker rods out of the well, where said running the plurality of sucker rods out of the well includes pulling the sucker rods through the blowout preventer;

h) tracking the plurality of sucker rods ad the plurality of sucker rods are pulled from the well by receiving identity information from the RFID tag reader included within the blowout preventer, where the identity information includes information relative to the identity of the RFID tag that is read by the RFID tag reader;

i) transporting one or more of the plurality of sucker rods from the production well to an inspection facility;

j) shot peening one or more of the plurality of sucker rods transported to the inspection facility, where said step of shot peening takes place while the RFID tag is secured thereto;

k) tracking information relative to the sucker rods while at said inspection facility, where the inspection facility includes an RFID reader, and where said step of tracking identity information relative to the sucker rods while at said inspection facility includes reading the RFID tag; and l) correlating the information related to the production well with the identity information.

10. The process of claim 9, further comprising gathering additional information at the wellhead as the well sucker rods are run into the well, where the additional information includes information relative to the sequence and quantity of well production devices run into the well.

11. The process of claim 9, further comprising assimilating the information relative to the identity of the RFID tag that is read by the RFID tag reader with information relative to the sequence and quantity of sucker rods run into the well.

* * * * *